(12) United States Patent
Dohi et al.

(10) Patent No.: US 10,533,629 B2
(45) Date of Patent: Jan. 14, 2020

(54) CENTRIFUGAL PENDULUM DAMPER AND TORQUE TRANSMISSION DEVICE

(71) Applicant: NSK LTD., Tokyo (JP)

(72) Inventors: Nagao Dohi, Fujisawa (JP); Hiroki Nishii, Fujisawa (JP); Shohei Kaneko, Fujisawa (JP); Eisaku Suzuki, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 16/069,702

(22) PCT Filed: Jan. 13, 2017

(86) PCT No.: PCT/JP2017/001111
§ 371 (c)(1),
(2) Date: Jul. 12, 2018

(87) PCT Pub. No.: WO2017/122812
PCT Pub. Date: Jul. 20, 2017

(65) Prior Publication Data
US 2019/0024751 A1  Jan. 24, 2019

(30) Foreign Application Priority Data

Jan. 14, 2016 (JP) ................ 2016-005329
Nov. 1, 2016 (JP) ................ 2016-214432
Jan. 10, 2017 (JP) ................ 2017-002042

(51) Int. Cl.
*F16F 15/14* (2006.01)
*F16F 15/12* (2006.01)
(Continued)

(52) U.S. Cl.
CPC ........ *F16F 15/145* (2013.01); *F16F 15/1202* (2013.01); *F16F 15/131* (2013.01); *F16F 15/134* (2013.01)

(58) Field of Classification Search
CPC ........ F16F 15/10; F16F 15/12; F16F 15/1202; F16F 15/131; F16F 15/134; F16F 15/14;
(Continued)

(56) References Cited

U.S. PATENT DOCUMENTS

2010/0122605 A1* 5/2010 Maienschein ....... F16F 15/1457
74/574.2
2012/0255394 A1* 10/2012 Maienschein ......... F16F 15/145
74/574.2
(Continued)

FOREIGN PATENT DOCUMENTS

DE 102014201888 A1 8/2015
JP 3060775 B2 7/2000
(Continued)

OTHER PUBLICATIONS

International Search Report dated Feb. 28, 2017, issued by the International Searching Authority in counterpart International Application No. PCT/JP2017/001111 (PCT/ISA/210).
(Continued)

*Primary Examiner* — Prasad V Gokhale
(74) *Attorney, Agent, or Firm* — Sughrue Mion, PLLC

(57) ABSTRACT

In the centrifugal pendulum damper, a plurality of pendulums are swingably supported on a rotating body. The pendulum includes a swinging shaft serving as the swing center and a rolling shaft including a rolling surface on the outer periphery thereof. The rotating body includes a plurality of pendulum support portions, and the pendulum support portion includes a swinging shaft guide portion that guides the swinging shaft in a radial direction of the rotating body, and a rolling shaft guide portion that is in rolling-contact with the rolling surface of the rolling shaft to cause the pendulum to swing around the swing axis.

15 Claims, 30 Drawing Sheets

(51) Int. Cl.
*F16F 15/131* (2006.01)
*F16F 15/134* (2006.01)

(58) Field of Classification Search
CPC .......... F16F 15/145; F16F 15/28; F16F 15/30; F16F 15/31; F16F 15/32
USPC .............................................. 74/572.2, 574.2
See application file for complete search history.

(56) References Cited

U.S. PATENT DOCUMENTS

| | | |
|---|---|---|
| 2013/0233124 A1 | 9/2013 | Wysgol et al. |
| 2015/0075320 A1* | 3/2015 | Verhoog ............... F16F 15/145 74/574.2 |

FOREIGN PATENT DOCUMENTS

| | | |
|---|---|---|
| JP | 2013522546 A | 6/2013 |
| JP | 2013164136 A | 8/2013 |
| JP | 5445423 B2 | 3/2014 |
| JP | 2015514941 A | 5/2015 |
| JP | 5746209 B2 | 7/2015 |

OTHER PUBLICATIONS

Written Opinion dated Feb. 28, 2017, issued by the International Searching Authority in counterpart International Application No. PCT/JP2017/001111 (PCT/ISA/237).

Communication dated Oct. 29, 2019 from the European Patent Office in counterpart application No. 17738564.8.

* cited by examiner

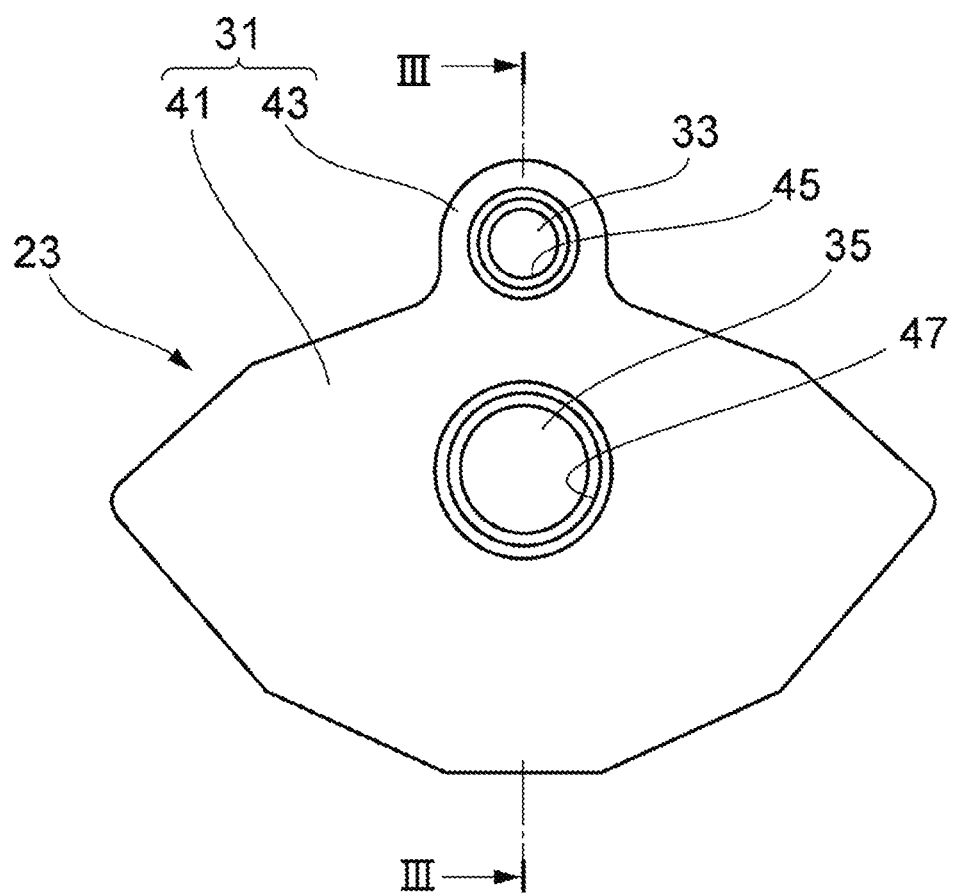

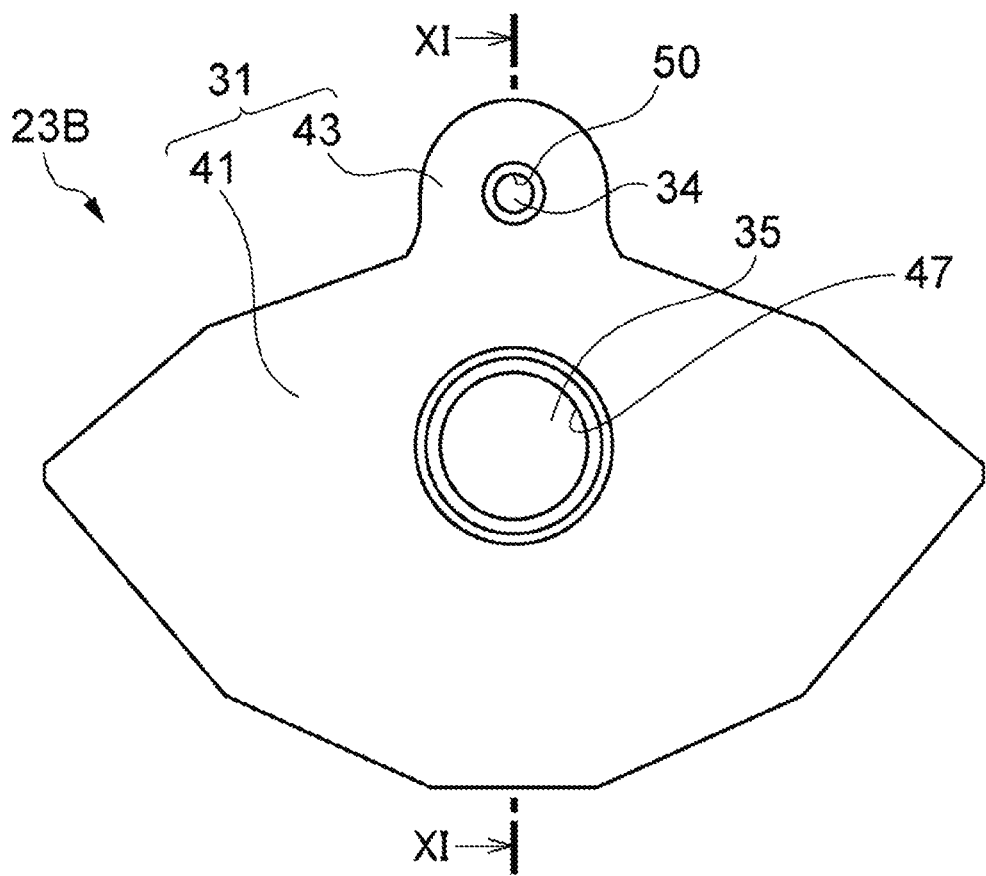

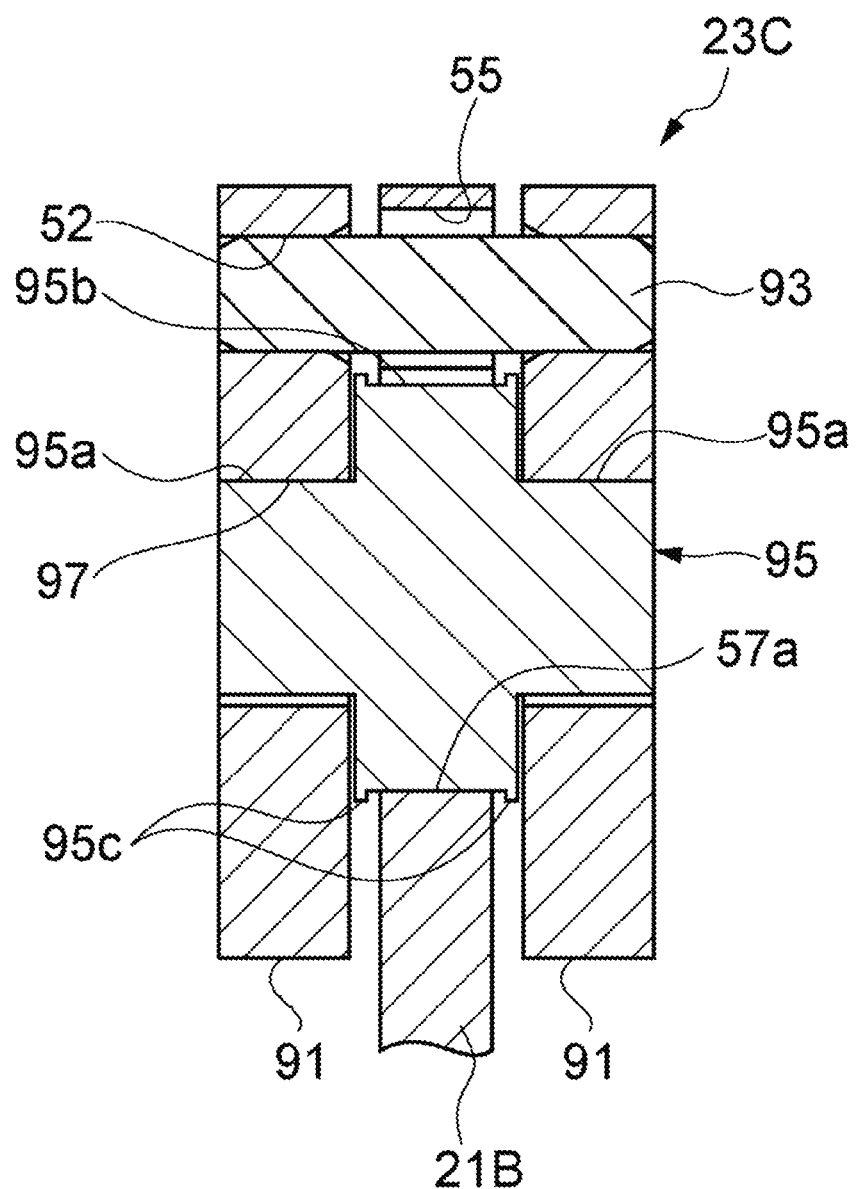

CENTRIFUGAL PENDULUM DAMPER AND TORQUE TRANSMISSION DEVICE

TECHNICAL FIELD

The present invention relates to a centrifugal pendulum damper and a torque transmission device.

BACKGROUND ART

In general, an automobile drives wheels via a crankshaft, an input shaft of a transmission, a drive shaft, or components mounted thereon and rotating integrally, by driving an engine. When the engine is driven, it is known that torsional vibrations corresponding to the number of cylinders of the engine are transmitted to the crankshaft or the like, causing many problems such as reduction of ride comfort and occurrence of abnormal noise of the transmission. Therefore, a number of dynamic dampers attached to a rotating body such as a crankshaft or the like to absorb or damp the torsional vibration of the rotating body have been proposed. As one example thereof, there is a centrifugal pendulum damper that damps torsional vibrations of a rotating body by a pendulum movement of the mass body with torsional vibration of the rotating body (see, for example, Patent Document 1).

The centrifugal pendulum damper disclosed in Patent Document 1 includes a pendulum chamber in which a mass body is swingably accommodated in a rotating direction of the rotating body, and a guide groove for guiding the rotating shaft of the mass body in the rotating direction of the rotating body, and supports the mass body to be movable in a radial direction of the rotating body. As a result, a trajectory of the position of the center of gravity due to the pendulum movement of the mass body is assumed to be a cycloid curve or the like. With this configuration, vibration damping performance independent of the magnitude of the amplitude of the mass body is obtained.

Further, if the frictional torque generated between the pendulum mass body and the pendulum support body is large, the centrifugal pendulum damper may hinder the function of the pendulum. Therefore, various techniques have been proposed to prevent the vibration absorbing function of the pendulum from being impaired due to the frictional torque.

For example, in a centrifugal force pendulum apparatus of Patent Document 2, a pendulum mass body is supported via a rolling element so as to be movable relative to a pivotable pendulum support body. Between the pendulum support body and the pendulum mass body, there is provided a guide part which at least locally reduces an axial interval between them. According to this centrifugal force pendulum apparatus, a tilting angle of the pendulum mass body can be reduced by the reduction in the gap distance between the pendulum mass body and the pendulum support body, and undesirable tilting of the individual pendulum mass body is avoided. As a result, the stability of the centrifugal force pendulum as a whole is improved.

Further, in a flywheel of Patent Document 3, a rolling chamber is formed in a rolling chamber constitution body fixed to the flywheel main body. The rolling chamber accommodates a damper mass that performs a centrifugal pendulum movement, while rolling in synchronism with the cycle of torque fluctuation of the rotation drive system to which the flywheel body is fixed. Convex portions continuous in a circumferential direction are formed on a circumferential surface of the damper mass. Further, on the rolling surface of the rolling chamber, a concave portion that meshes with the convex portion and continues in the rolling direction is formed. In the flywheel, the convex portion and the concave portion constitute a guide rail structure. According to this flywheel, since the meandering of the damper mass is prevented by the guide rail structure, a contact area between a side surface of the damper mass and an inner surface of the rolling chamber is reduced. As a result, the frictional torque generated in the direction of preventing the centrifugal pendulum movement of the damper mass can also be reduced.

PRIOR ART DOCUMENT

Patent Document

Patent Document 1: Japanese Patent No. 5445423
Patent Document 2: Japanese Patent No. 5746209
Patent Document 3: Japanese Patent No. 3060775

SUMMARY OF THE INVENTION

Problems to be Solved by the Invention

However, in the centrifugal pendulum damper disclosed in Patent Document 1, since the pendulum accommodating chamber and the guide groove are arranged so as to be greatly spaced apart from each other in the radial direction of the rotating body, the size of the portion for holding the mass body becomes large, causing a large size of the centrifugal pendulum damper. In addition, since it is necessary to provide the pendulum chamber, the guide groove, and the support mechanism section that supports the mass body so as to be movable in the radial direction of the rotating body, the processing cost increases and it was difficult to reduce the manufacturing cost.

Further, in the centrifugal force pendulum apparatus of Patent Document 2, a washer, a protrusion or the like for reducing the gap between the side surface of the pendulum mass body and the pendulum support body is provided on the outer side in the radial direction than the flange-like guide portion of the rolling element. Therefore, an abutment surface for generating frictional torque is disposed on the outer diameter side of the guide portion of the rolling element. Also in the flywheel of Patent Document 3, the abutment surfaces of the convex portion and the concave portion constituting the guide rail structure are arranged on the outer side of the flywheel body in the radial direction than the damper mass.

Here, FIG. 22A illustrates a centrifugal pendulum damper 500 of the related art as an example configuration in which an abutment surface is disposed outside the guide portion of the rolling element. In the centrifugal pendulum damper 500, a support hole 503 is formed in a pendulum support body 501, and a pendulum 505 is provided swingably in the support hole 503. The pendulum 505 includes a pair of pendulum mass bodies 507 disposed with the pendulum support body 501 interposed therebetween, and a rolling element 509 rotatably supported at a shaft end by the pendulum mass body 507 and inserted through the support hole 503. The centrifugal pendulum damper 500 prevents occurrence of frictional torque due to contact between the pendulum mass body 507 and the pendulum support body 501 by a pair of annular guide portions 511 protruding from the outer peripheral surface of the rolling element 509. FIG. 22A illustrates a state in which the pendulum support body 501 and the pendulum 505 are in a neutral positional relationship, and FIG. 22B illustrates a state in which the pendulum 505 approaches one side in the axial direction (a left side in the drawing) with respect to the pendulum support body 501. In a state in which the centrifugal pendulum damper 500 is positioned on one side, the annular guide portion 511 of the rolling element 509 abuts against the pendulum mass body 507 at the sliding contact portion 513 on the radially outer side of the pendulum support body 501. In this case, the distance R from a rotation axis 515 of the rolling element 509 to the radially outer abutment surface increases, and the frictional torque on the abutment surface greatly acts on the rotation of the rolling element 509. As a result, the swinging of the pendulum 505 is hindered, which is disadvantageous for exerting the vibration absorbing function of the rotary vibration by the pendulum 505.

The present invention has been made in view of the above circumstances, and a first object of the present invention is to provide a centrifugal pendulum damper and a torque transmission device that can be reduced in size and weight, while reducing manufacturing costs.

Further, a second object of the present invention is to provide a centrifugal pendulum damper which reduces the frictional torque between the pendulum support body and the pendulum and does not lower the damping effect of the rotational vibration, even when axial displacement occurs in the pendulum.

Means for Solving the Problems

The present invention has a configuration as described below.

(1) A centrifugal pendulum damper in which a plurality of pendulums is swingably supported on a rotating body, wherein the pendulum includes a swinging shaft serving as the swing center of the pendulum and a rolling shaft including a rolling surface on an outer periphery thereof, the rotating body includes a plurality of pendulum support portions which is provided to correspond to the plurality of pendulums and supports the swinging shaft and the rolling shaft, and the pendulum support portion includes a swinging shaft guide portion including a radial guide surface configured to guide the swinging shaft in a radial direction of the rotating body, and a rolling shaft guide portion including a swing guide surface configured to come into rolling-contact with the rolling surface of the rolling shaft to cause the pendulum to swing around the swinging shaft.

(2) A centrifugal pendulum damper in which a support hole is formed in a pendulum support body to which a rotational force is transmitted, and a pendulum is swingably attached to the support hole, wherein the pendulum includes a pair of pendulum mass bodies connected by sandwiching the pendulum support body in an axial direction, and a rolling element inserted through the support hole and including an axial end portion supported by the pendulum mass body, and the pendulum mass body includes a rolling element support portion into which the shaft end portion of the rolling element is inserted to be supported in a rollable and axially movable manner, and an abutment portion against which a part of the axial end portion abuts in a rearward displacement direction of the rolling element when the pendulum is displaced in the axial direction.

(3) A torque transmission device including the centrifugal pendulum damper.

Effect of the Invention

According to the present invention, it is possible to reduce the size and weight, while reducing the manufacturing cost of the centrifugal pendulum damper and the torque transmission device.

Further, according to the present invention, it is possible to reduce the frictional torque between the pendulum support body and the pendulum and to prevent the damping effect of the rotational vibration from being lowered even when the pendulum is displaced in the axial direction.

BRIEF DESCRIPTION OF DRAWINGS

FIG. 3A is a front view of a pendulum.

FIG. 11A is a front view of a pendulum of a fourth configuration example.

FIG. 13B is a cross-sectional view taken along the line XIII-XIII of the pendulum and the pendulum support body illustrated in FIG. 12.

DESCRIPTION OF EMBODIMENTS

Hereinafter, embodiments of the present invention will be described in detail with reference to the drawings.

<First Configuration Example>

Figure 1:
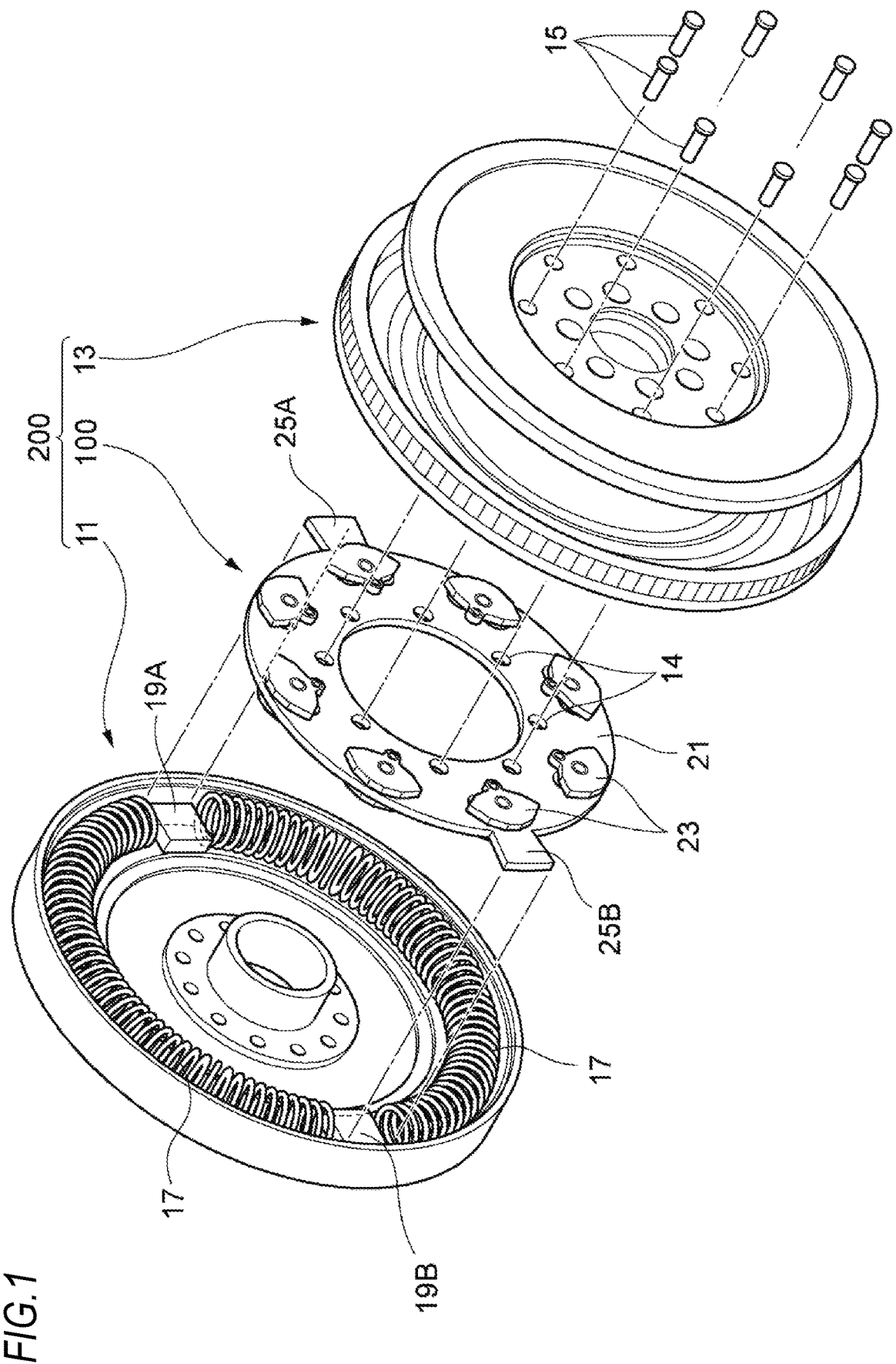
FIG. 1 is an exploded perspective view of a torque transmission device including a centrifugal pendulum damper.

FIG. 1 is an exploded perspective view of a torque transmission device including a centrifugal pendulum damper.

A centrifugal pendulum damper 100 is provided inside the torque transmission device 200, as a part of the torque transmission device 200, and is suitably used for reducing the rotational fluctuation, for example, constant-order rotational fluctuation generated in an internal combustion engine such as an automobile engine. As the engine, it is possible to use an internal combustion engine such as a gasoline engine, a diesel engine, and an LPG engine which burns fuel, converts the thermal energy into kinetic energy, and outputs from the crankshaft. The centrifugal pendulum damper 100 of this configuration is provided in a power transmission path from the engine to the driven member (drive wheel, etc.). Hereinafter, a case where the centrifugal pendulum damper 100C is provided on the flywheel on the downstream side of the crankshaft will be described as an example.

The torque transmission device 200 includes a first flywheel 11 and a second flywheel 13 that are disposed coaxially with each other. The first flywheel 11 is connected to a crankshaft (not illustrated) side of the internal combustion engine, and the second flywheel 13 is connected to a transmission (not illustrated) side. The centrifugal pendulum damper 100 is fastened to the second flywheel 13 by screwing bolts 15 from the second flywheel 13 side into a plurality of fixing holes 14 including internal threads, respectively. As a result, the centrifugal pendulum damper 100 is fixed coaxially with the second flywheel 13. A pair of compression coil springs 17, which are elastic bodies, are accommodated in the inner periphery of the first flywheel 11 along the circumferential direction.

Figure 2:
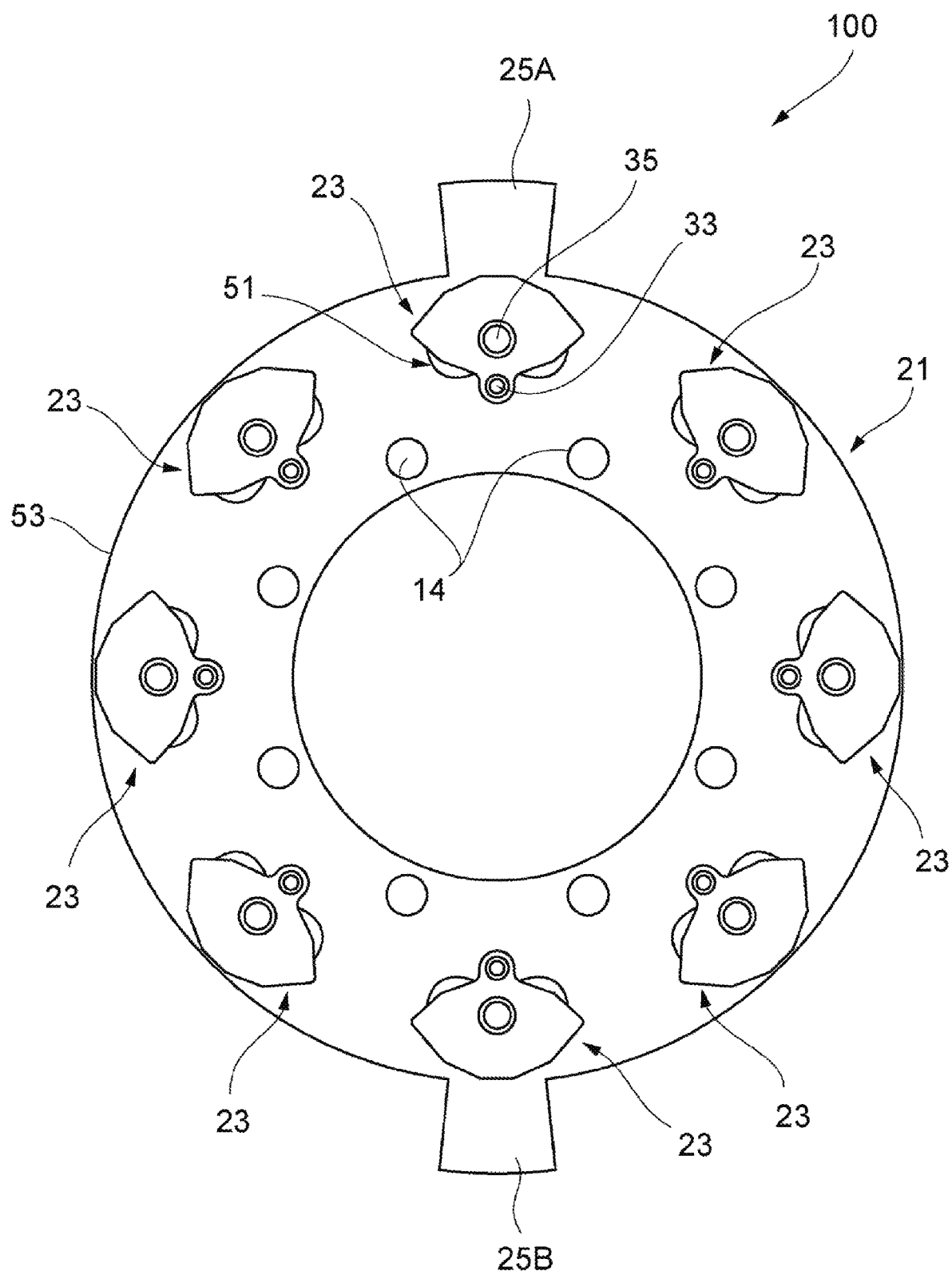
FIG. 2 is a plan view of the centrifugal pendulum damper illustrated in FIG. 1.

FIG. 2 is a plan view of the centrifugal pendulum damper 100.

The centrifugal pendulum damper 100 includes a pendulum support body 21 which is a rotating body made of an annular plate and a plurality (eight in this configuration example) of pendulums 23 provided on the pendulum support body 21. On a part of the outer peripheral edge 53 of the pendulum support body 21, leg portions 25A and 25B projecting outward in the radial direction are provided at symmetrical positions around the center of rotation of the pendulum support body 21. The leg portions 25A and 25B are disposed between the end portions of the compression coil springs 17 provided on the inner periphery of the first flywheel 11 illustrated in FIG. 1. Between the end portions of the first flywheel 11, spring seat convex portions 19A and 19B projecting inward from the bottom surface of the first flywheel 11 facing the second flywheel 13 are formed. The leg portions 25A and 25B are arranged to face the spring seat convex portions 19A and 19B in the axial direction, and the circumferential end portions are in contact with the end portions of the compression coil spring 17.

The leg portions 25A and 25B compress the end portion of the compression coil spring 17 according to the rotational torque transmitted to the first flywheel 11. That is, when torque is transmitted from the first flywheel 11 to the pendulum support body 21 (and the second flywheel 13), as the torque transmission device 200 presses the legs 25A and 25B at the end of the compression coil spring 17, the pendulum support body 21 rotates. As a result, the rotational force is transmitted to the second flywheel 13 fixed to the pendulum support body 21.

Figure 3B:
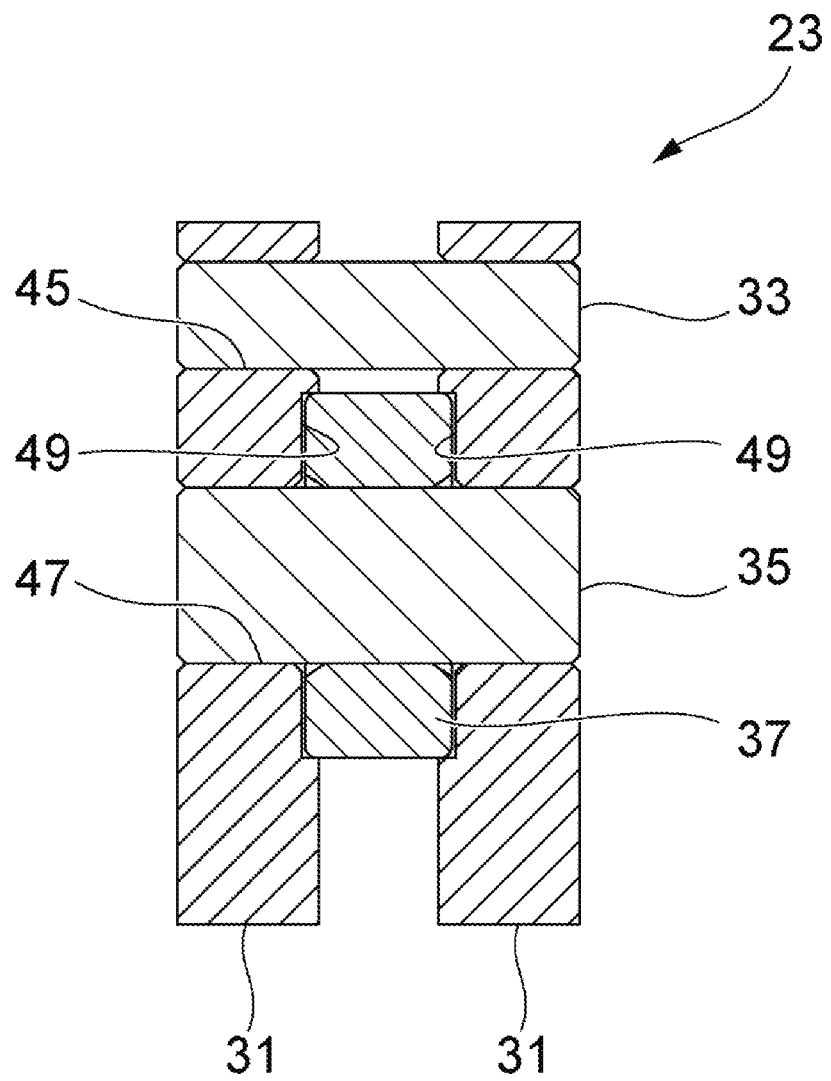
FIG. 3B is a cross-sectional view taken along line III-III of the pendulum illustrated in FIG. 3A.

FIG. 3A is a front view of the pendulum 23, and FIG. 3B is a cross-sectional view of the pendulum 23 taken along the line A-A in FIG. 3A.

The pendulum 23 includes a pair of pendulum pieces (mass body) 31 having the same shape, a swinging shaft 33 and a roller shaft 35 integrally for connecting the pair of pendulum pieces 31. The swinging shaft 33 serves as the swing center of the pendulum 23, and the roller shaft 35 is a rolling shaft that rotatably supports the roller 37 that moves along a swinging trajectory to be described later.

The pair of pendulum pieces 31 is formed in a sector shape in a front view and includes a pendulum main body 41 including a fan-shaped outer peripheral portion in a substantially circular arc shape, a protruding portion 43 provided so as to protrude toward the fan-shaped inner periphery side of the pendulum main body 41. A through hole 45 is formed in the protruding portion 43, and the swinging shaft 33 is fitted in the through hole 45. A through hole 47 is also formed in the pendulum main body 41, and the roller shaft 35 is fitted in the through hole 47. A relief portion 49 for accommodating the end portion of the roller 37 is formed on the pair of pendulum pieces 31, respectively, on the inner side surfaces opposed to each other with the roller 37 interposed therebetween. Here, although the roller 37 is illustrated in a simplified manner in FIG. 3, it is constituted using a sliding bearing or a rolling bearing including inner and outer rings.

Figure 4:
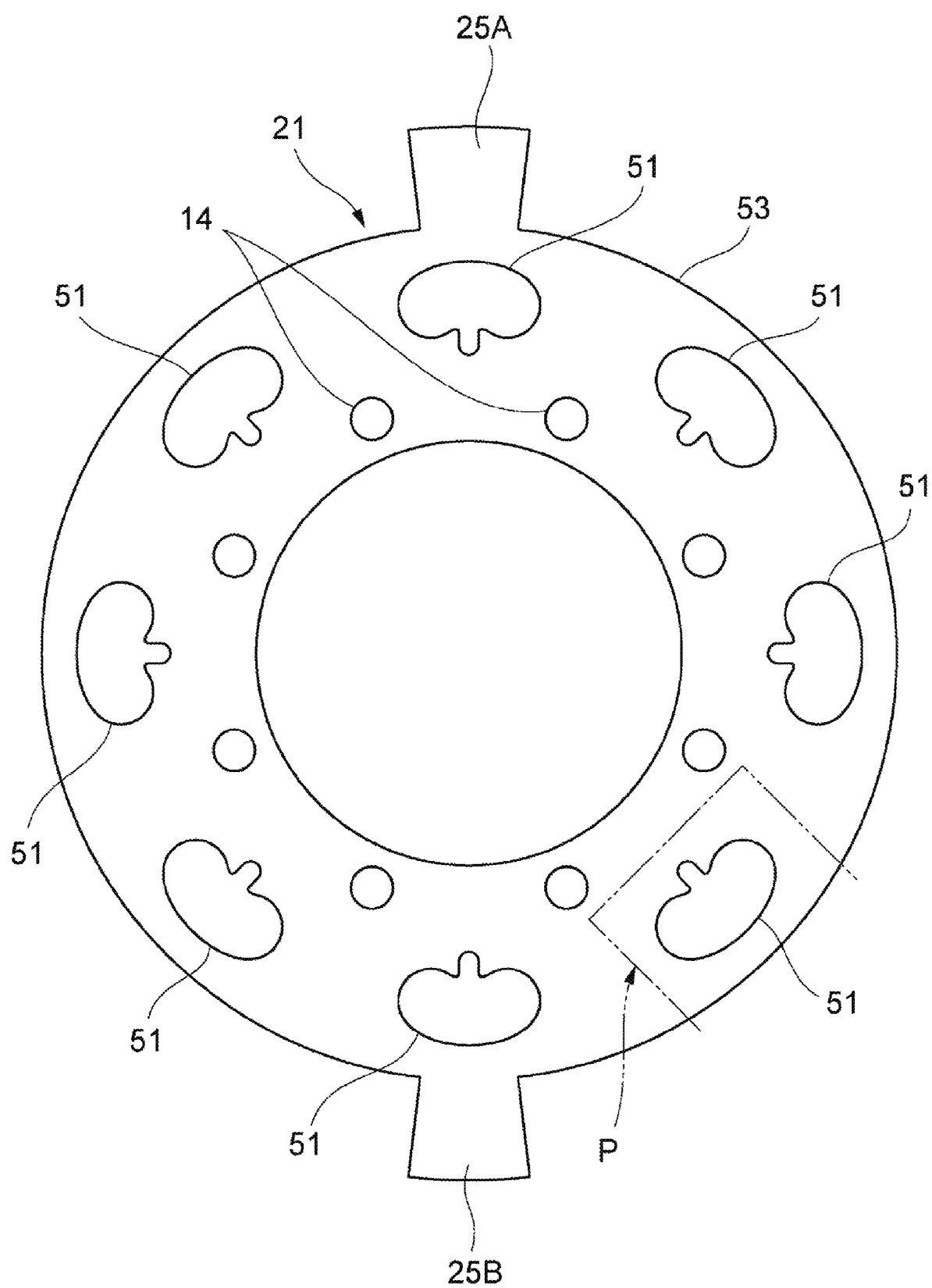
FIG. 4 is a plan view of a pendulum support body.
Figure 5:
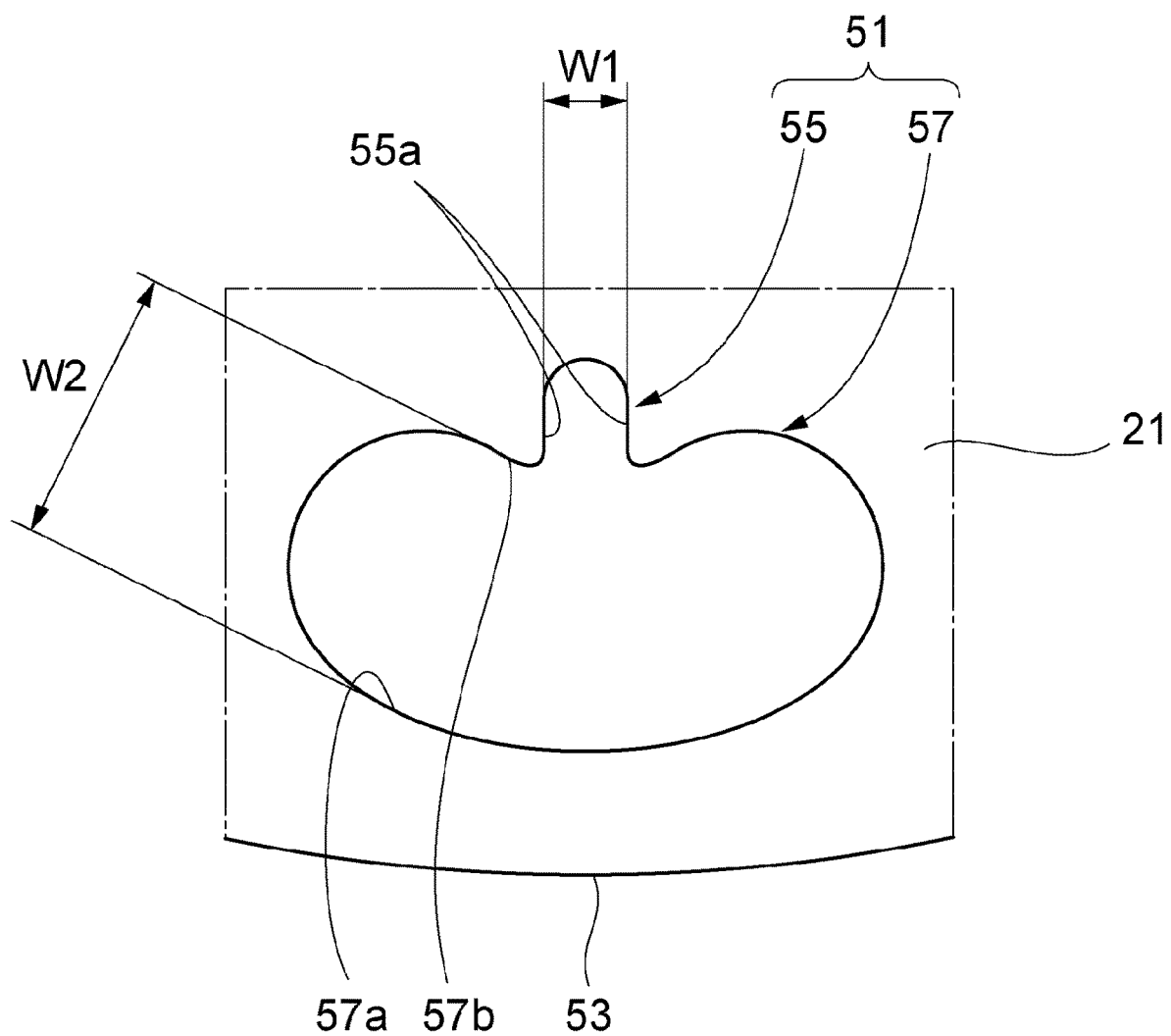
FIG. 5 is an enlarged view of a part P illustrated in FIG. 4.

FIG. 4 is a plan view of the pendulum support body 21, and FIG. 5 is an enlarged view of a Part P illustrated in FIG. 4.

As illustrated in FIG. 4, in the pendulum support body 21, a guide hole 51 as a pendulum support portion to which the pendulum 23 is attached is formed at equal intervals at a plurality of positions in the circumferential direction along the outer peripheral edge 53. As illustrated in FIG. 5, each of the guide holes 51 is a through hole which includes a swinging shaft guide portion 55 through which the swinging shaft 33 of the pendulum 23 is inserted, and a roller shaft guide portion (rolling shaft guide portion) 57 through which the roller shaft 35 of the pendulum 23 is inserted.

As illustrated in FIG. 2, in the pendulum 23, the swinging shaft 33 and the roller shaft 35 are inserted through the guide hole 51 of the pendulum support body 21, and a pair of pendulum pieces 31 (FIGS. 3A and 3B) is supported on the pendulum support body 21 with the pendulum support body 21 sandwiched therebetween. A total of eight pendulums 23 are equally distributed in the circumferential direction of the pendulum support body 21 on the pendulum support body 21 of this configuration. As illustrated in FIG. 5, the swinging shaft guide portion 55 is arranged on the inner circumferential side of the pendulum support body of the guide hole 51, and the roller shaft guide portion 57 is disposed on the outer circumferential side of the pendulum support body. The pendulum 23 is supported on the pendulum support body 21 so as to be able to oscillate about the oscillation shaft 33.

The swinging shaft guide portion 55 guides the swinging shaft 33 in the radial direction of the pendulum support body 21. The roller shaft guide portion 57 rolls the pendulum 23 about the swinging shaft 33 as the roller 37 rolls in the circumferential direction of the pendulum support body 21.

A width (groove width W1) between the side walls 55a facing each other of the swinging shaft guide portion 55 is slightly larger than the diameter of the swinging shaft 33. A width (groove width W2) between the side wall 57a of the roller shaft guide portion 57 on the outer peripheral side and the side wall 57b on the inner peripheral side is slightly larger than the diameter of the roller 37. As a result, the swinging shaft 33 is smoothly guided to the side wall 55a (radial guide surface) of the swinging shaft guide portion 55, and the roller shaft 35 rolls on the outer peripheral surface of the roller 37 to the side wall (swing guide surface) 57a by being brought into contact, and is smoothly guided to the roller shaft guide portion 57.

Next, the operation of the centrifugal pendulum damper having the above structure will be described.

The pendulum 23 swings in the circumferential direction of the pendulum support body 21, while being guided by the two guide portions of the oscillation shaft guide portion 55 and the roller shaft guide portion 57.

Figure 6A:
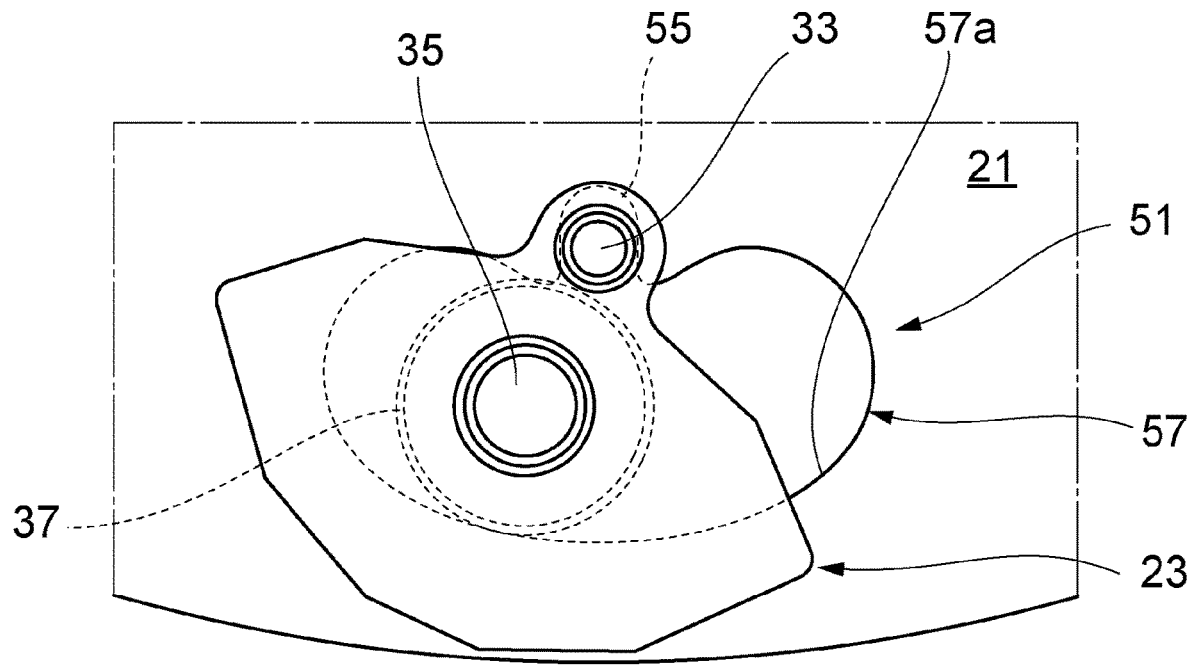
FIG. 6A is an explanatory diagram illustrating an aspect of a pendulum swinging, while being guided by a guide hole in a stepwise manner.
Figure 6B:
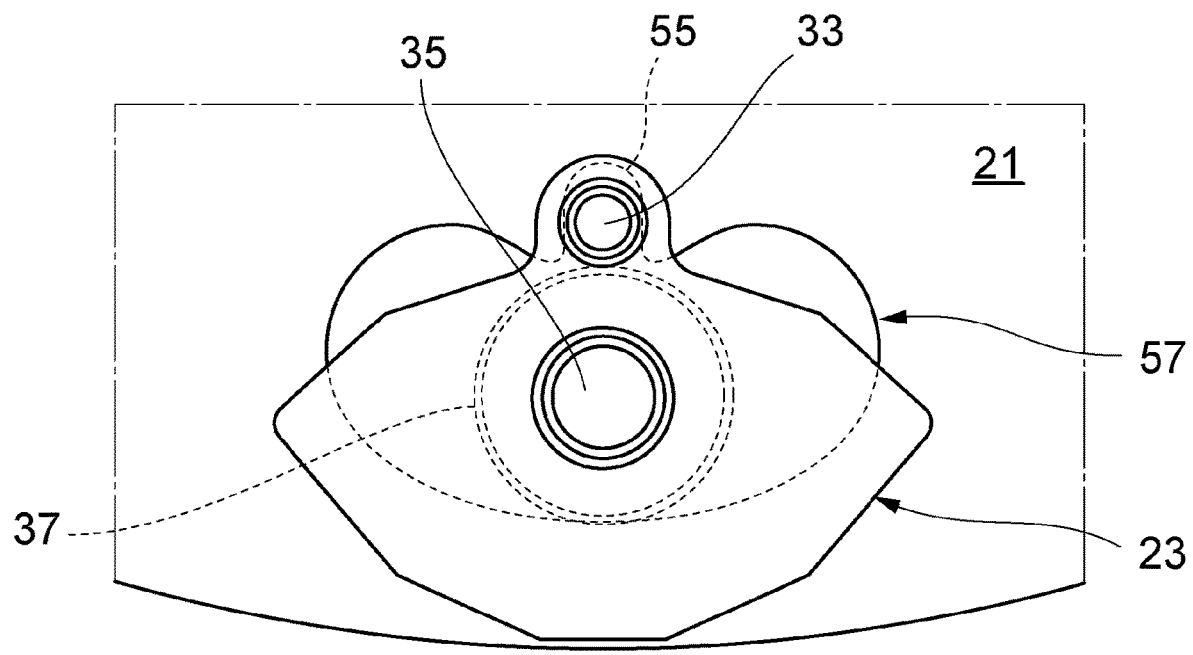
FIG. 6B is an explanatory diagram illustrating an aspect of a pendulum swinging, while being guided by a guide hole in a stepwise manner.
Figure 6C:
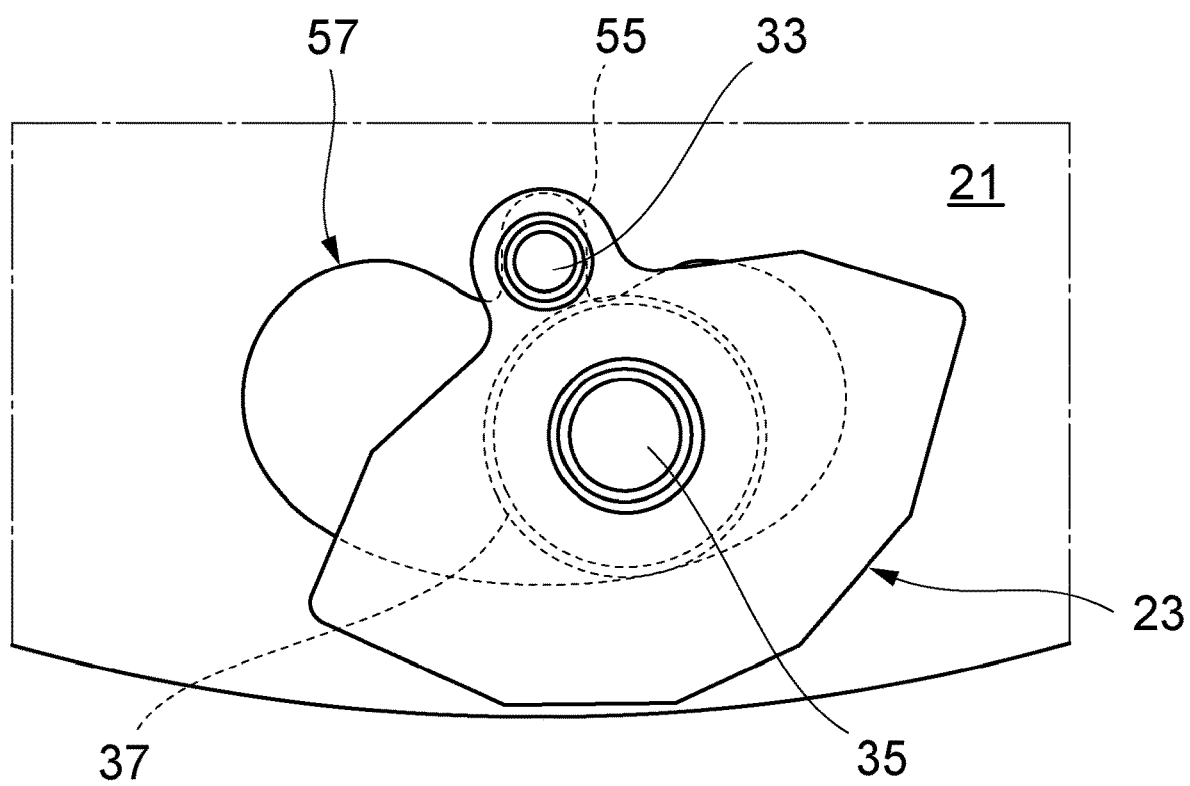
FIG. 6C is an explanatory diagram illustrating an aspect of a pendulum swinging, while being guided by a guide hole in a stepwise manner.

FIGS. 6A, 6B, and 6C are explanatory diagrams illustrating the state of the pendulum 23 which swings while being guided by the guide hole 51 in a stepwise manner.

The pendulum 23 swings about the swinging shaft 33 as the roller 37 rolls on the roller shaft guide portion 57. When the roller 37 of the pendulum 23 illustrated in FIG. 6B moves toward the circumferential end of the roller shaft guide portion 57 of the pendulum support body 21, as illustrated in FIGS. 6A and 6C, the swinging shaft 33 of the pendulum 23 moves radially outward of the swinging shaft guide portion 55.

Therefore, in the swing motion of the pendulum 23, the center of gravity position of the pendulum 23 does not draw a trajectory of a single radius from the trajectory center (the center of curvature of the side wall 57a) of the roller shaft guide portion 57, but draws a trajectory in which the radial distance becomes shorter as the deflection angle increases.

The swing trajectory of the pendulum 23 will be described in more detail.

Figure 7:
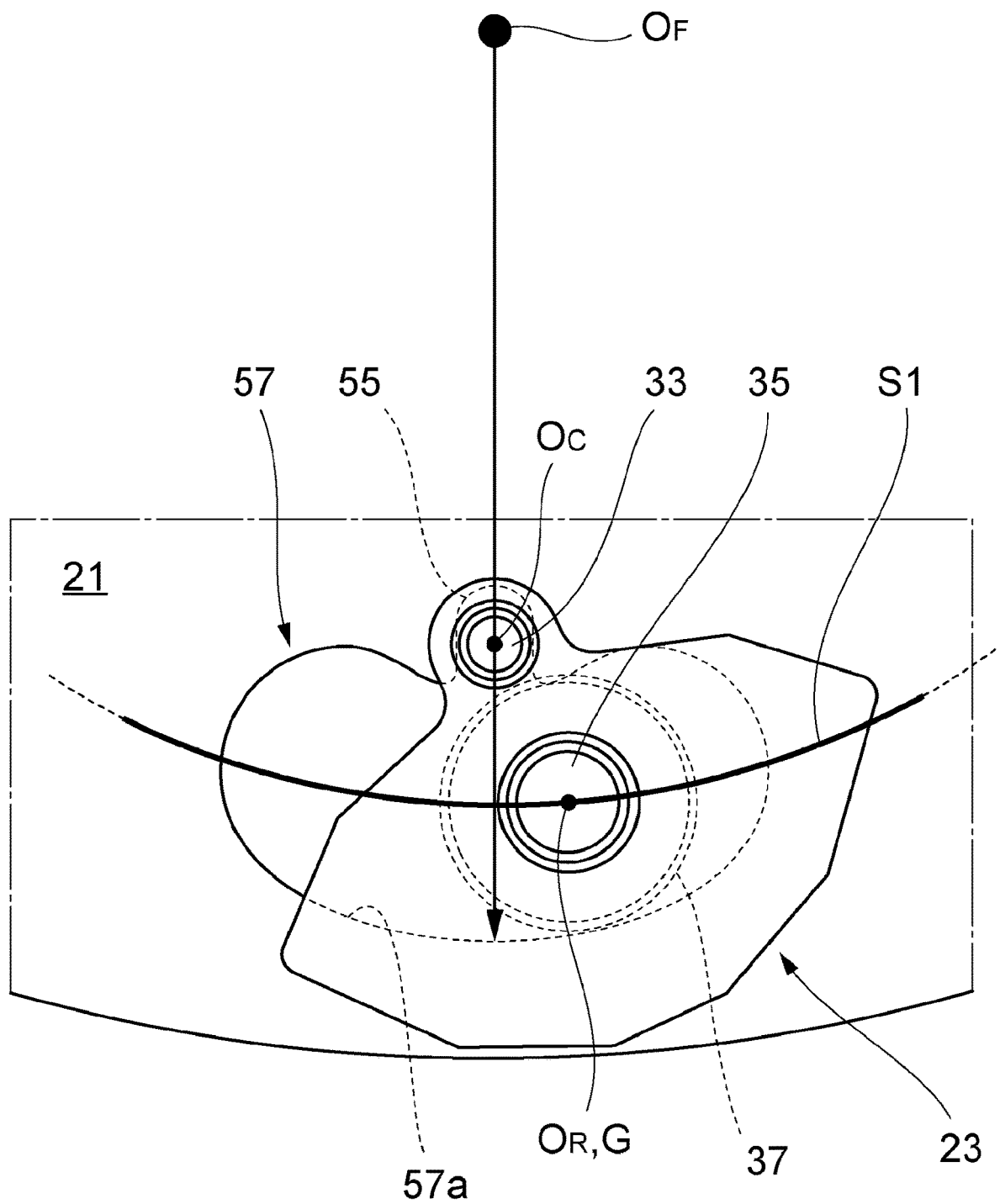
FIG. 7 is an explanatory view illustrating a trajectory of the position of the center of gravity of the pendulum when the center of gravity position of the pendulum coincides with the center of the roller shaft.

FIG. 7 is an explanatory view illustrating the trajectory of the center of gravity position G of the pendulum 23 when the center of gravity position G of the pendulum 23 coincides with the center OR of the roller shaft 35. As illustrated in FIG. 7, the roller 37 of the pendulum 23 rolls and moves along the side wall 57a of the roller shaft guide portion 57. In this case, the center of gravity position G of the pendulum 23 draws a trajectory S1 of a single radius centered on the curvature center OF of the side wall 57a.

However, if the center of gravity position G of the pendulum 23 deviates from the center OR of the roller shaft 35, even when the roller 37 is moved on the trajectory of a single radius, it is possible to move the position of the center of gravity of the pendulum 23 on a different trajectory other than a single radius. For example, the trajectory of the center of gravity position of the pendulum 23 can be a curve such as a cycloid curve or an epicycloid curve. For details on this point, see, for example, Japanese Patent No. 5445423, if necessary.

Figure 8:
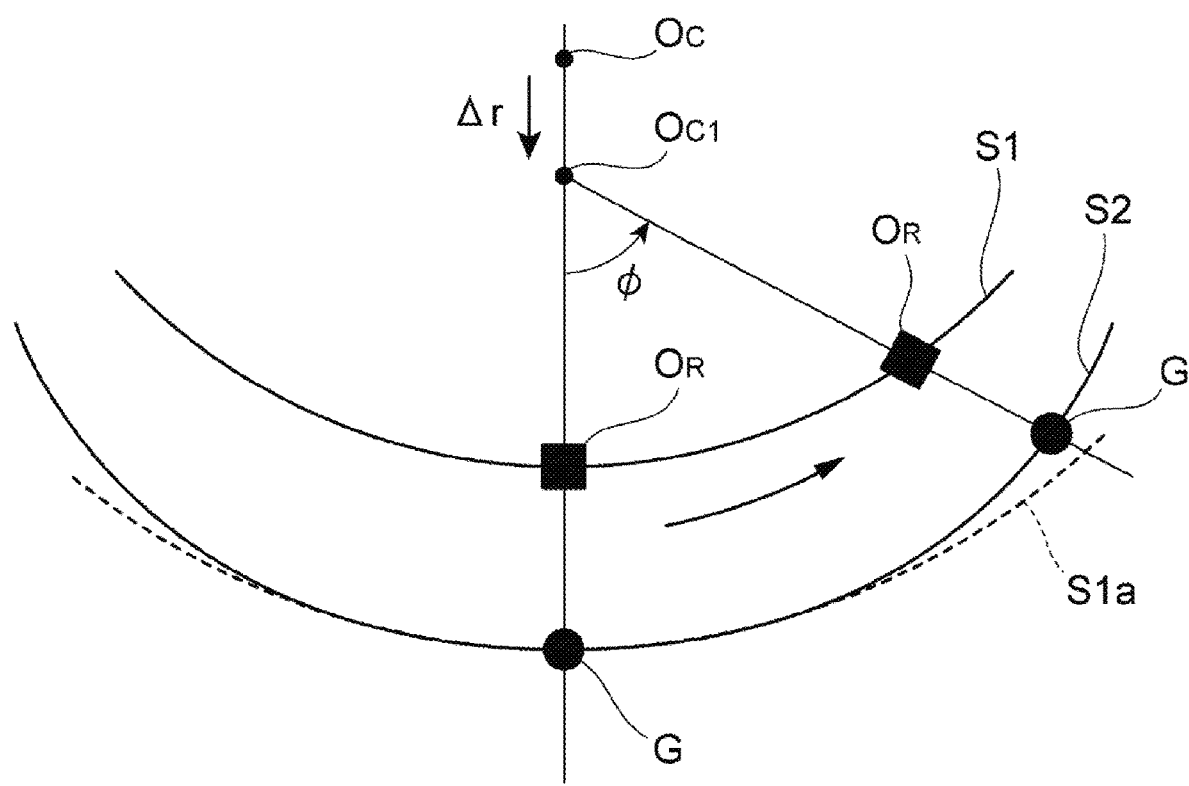
FIG. 8 is an explanatory view illustrating the trajectory of the position of the center of gravity of the pendulum when the center of gravity position of the pendulum deviates from the center of the roller shaft.

FIG. 8 is an explanatory view illustrating the trajectory S2 of the center of gravity position G of the pendulum 23 when the center of gravity position G of the pendulum 23 deviates from the center OR of the roller shaft 35. As illustrated in FIG. 8, the centrifugal pendulum damper 100 of the present configuration is configured such that as an oscillation angle $\phi$ of the pendulum 23 increases, the swing center Oc of the swinging shaft 33 moves outward in the radial direction of the pendulum support body 21 (lower side in FIG. 8).

That is, from the state if 6B to the state of FIGS. 6A and 6C, the swinging shaft 33 is guided by the swinging shaft guide portion 55 and moves radially outward of the pendulum support body 21 by $\Delta r$. As a result, the swing center Oc illustrated in FIG. 8 changes to the position of the swing center Oc1. Then, the center of gravity position G of the pendulum 23 becomes a trajectory S2 having a shorter radial distance from the swing center Oc1, as compared with the trajectory S1a along the trajectory S1. That is, the curvature radius of the trajectory S2 is smaller than the curvature radius of the trajectory S1.

The trajectory S2 can be changed to an arbitrary curve by adjusting $\Delta r$ or the like. The curve of the trajectory S2 is particularly preferably a cycloid curve or an epicycloid curve, or a pseudo cycloid curve or epicycloid curve close thereto.

According to this configuration, the swinging motion of the pendulum 23 causes the center of gravity position G of the pendulum 23 to draw a trajectory S2, such as a cycloid curve or an epicycloid curve, which is likely to cause a pendulum movement of a constant period. As a result, from the small torque fluctuation to the large torque fluctuation, the torsional vibrations of the members connected to the pendulum support body 21 and the pendulum support body 21 can always be stably damped.

When the swinging shaft 33 moves in the swinging shaft guide portion 55, depending on the shape of the swinging shaft guide portion 55, the pendulum 23 may fall off from the pendulum support body 21. Therefore, in this configuration, the side wall 57a on the outer peripheral side of the roller shaft guide portion 57 functions as a stopper for preventing the swinging shaft 33 from coming off from the swinging shaft guide portion 55.

Further, a large load is hard to exert on the swinging shaft 33 from the outside, but a load including a centrifugal force is applied to the roller shaft 35. Therefore, the roller shaft 35 is formed of a member having a larger shaft diameter than the swinging shaft 33.

In the centrifugal pendulum damper 100 configured as described above, the swinging shaft 33 of the pendulum 23 is supported so as to be movable in the radial direction of the pendulum support body 21 along the swinging shaft guide portion 55. Therefore, when the pendulum support body 21 rotates, the roller 37 is pressed against the side wall 57a on the outer peripheral side of the roller shaft guide portion 57 by the centrifugal force acting on the pendulum 23. When the pendulum 23 swings in accordance with the vibration of the pendulum support body 21 due to the torsional vibration of the rotary shaft, the roller 37 moves back and forth in the roller shaft guide portion 57, while rolling on the side wall 57a of the roller shaft guide portion 57. As a result, the center of gravity position G of the pendulum 23 moves along the above-described trajectory S2.

Therefore, according to the centrifugal pendulum damper 100 of the present configuration, it is possible to reduce the torsional vibration of the rotating shaft without depending on the magnitude of the amplitude of the pendulum 23, that is, the magnitude of the torque fluctuation.

Further, according to the centrifugal pendulum damper 100 of the present configuration, since the swinging shaft guide portion 55 and the roller shaft guide portion 57 are constituted by one hole (guide hole 51), the swinging shaft guide portion 55 and the roller shaft guide portion 57 can be formed at the same time. Therefore, each guide portion can be formed at low cost and with high accuracy, without complicating the manufacturing process.

Furthermore, in the centrifugal pendulum damper 100 of the present configuration, there is no need to separately provide a support mechanism for supporting the pendulum 23 to be movable in the radial direction of the pendulum support body 21. Therefore, the mechanism can be simplified, which contributes to the reduction in weight and size of the apparatus.

In the centrifugal pendulum damper 100 of the present configuration, a relief portion 49 (see FIG. 3B) for receiving the end portion of the roller 37 is provided at the opposing portion of the pendulum piece 31 across the roller 37. Therefore, the axial width of the pendulum piece 31 with respect to the axial width of the centrifugal pendulum damper 100 can be made relatively large. As a result, it is possible to increase the weight of the pendulum piece 31 as a mass body, thereby further improving the vibration damping performance. This configuration is particularly beneficial when the installation space in the axial direction of the centrifugal pendulum damper 100 is severely limited.

<Second Configuration Example>

Next, a second configuration example of the centrifugal pendulum damper will be described.

Figure 9:
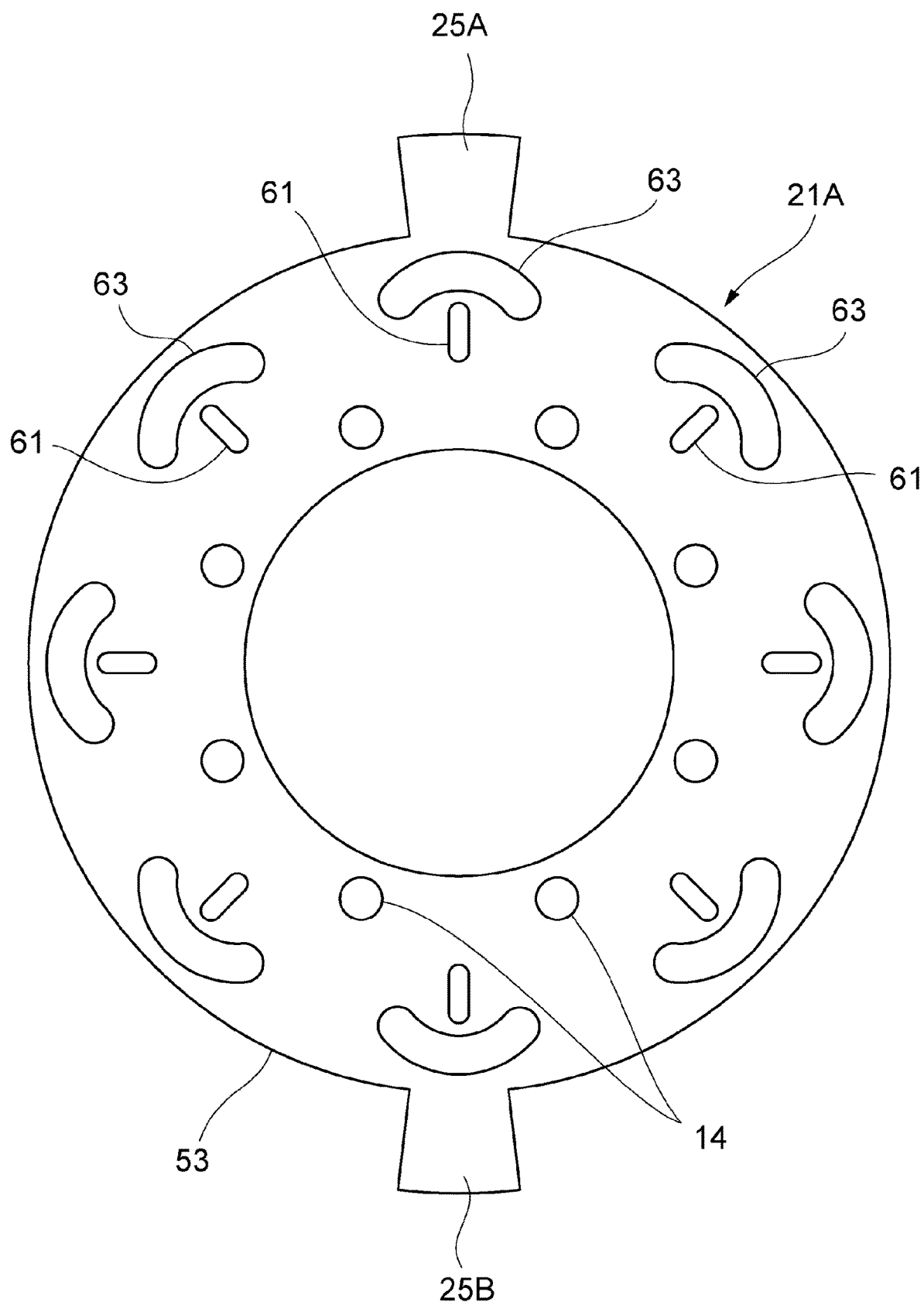
FIG. 9 is a plan view of the pendulum support body in the centrifugal pendulum damper of a second configuration example.

FIG. 9 is a plan view of a pendulum support body 21A in the centrifugal pendulum damper of the second configuration example. In the following description, the same members and parts as those described above are denoted by the same reference numerals, and the description thereof will be simplified or omitted.

The pendulum support body 21A of the present configuration is the same as the aforementioned pendulum support body 21 except that the swinging shaft guide portion 61 and the roller shaft guide portion 63 are arranged separately in a radial direction, while being separated from each other.

According to the swinging shaft guide portion 61 and the roller shaft guide portion 63 of this configuration, since each guide portion can be independently formed, the degree of freedom in designing the shape of the guide portion is improved. In particular, when it is desired to secure a long trajectory of the swinging shaft 33, only the swinging shaft guide portion 61 may be changed.

<Third Configuration Example>

Next, a third configuration example of the centrifugal pendulum damper will be described.

Figure 10:
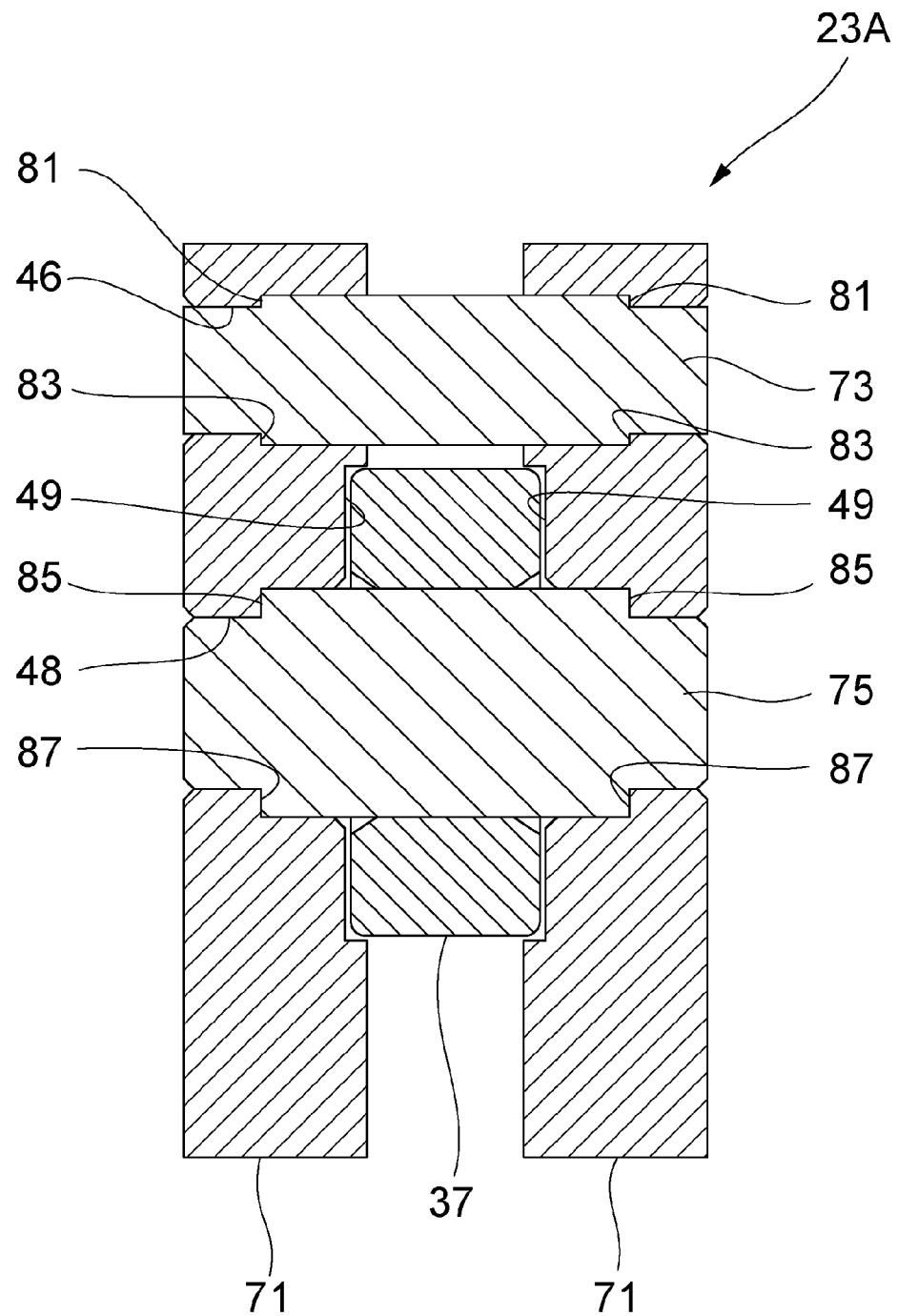
FIG. 10 is a cross-sectional view of the pendulum of a third configuration example taken along line illustrated in FIG. 3A.

FIG. 10 is a cross-sectional view of the pendulum of the third configuration example taken along line illustrated in FIG. 3A. In a pendulum 23A of this configuration, stepped portions 81 having a smaller diameter than the central portion of the swinging shaft 73 are formed at both end portions of a swinging shaft 73. Further, a stepped portion 83 is formed in a through hole 46 of a pendulum piece 71 to abut against the stepped portion 81 of the swinging shaft 73. Similarly for the roller shaft 75, stepped portions 85 are formed at both end portions of the roller shaft 75, and a stepped portion 87 is formed in the through hole 48 of the pendulum piece 71.

According to the pendulum 23A of this configuration, the axial distance between the pair of pendulum pieces 71 can be kept constant by the engagement of the stepped portions 81 and 83 and the engagement of the stepped portions 85 and 87. Therefore, the roller 37 is sandwiched between the pendulum pieces 71 with a gap in the axial direction, thereby reliably preventing the friction between the roller 37 and the pendulum piece 71. As a result, there is no bearing in the swing motion of the pendulum 23A, and the vibration damping performance of the vibration can always be stably and favorably maintained at all times.

<Fourth Configuration Example>

Next, a fourth configuration example of the centrifugal pendulum damper will be described.

Figure 11B:
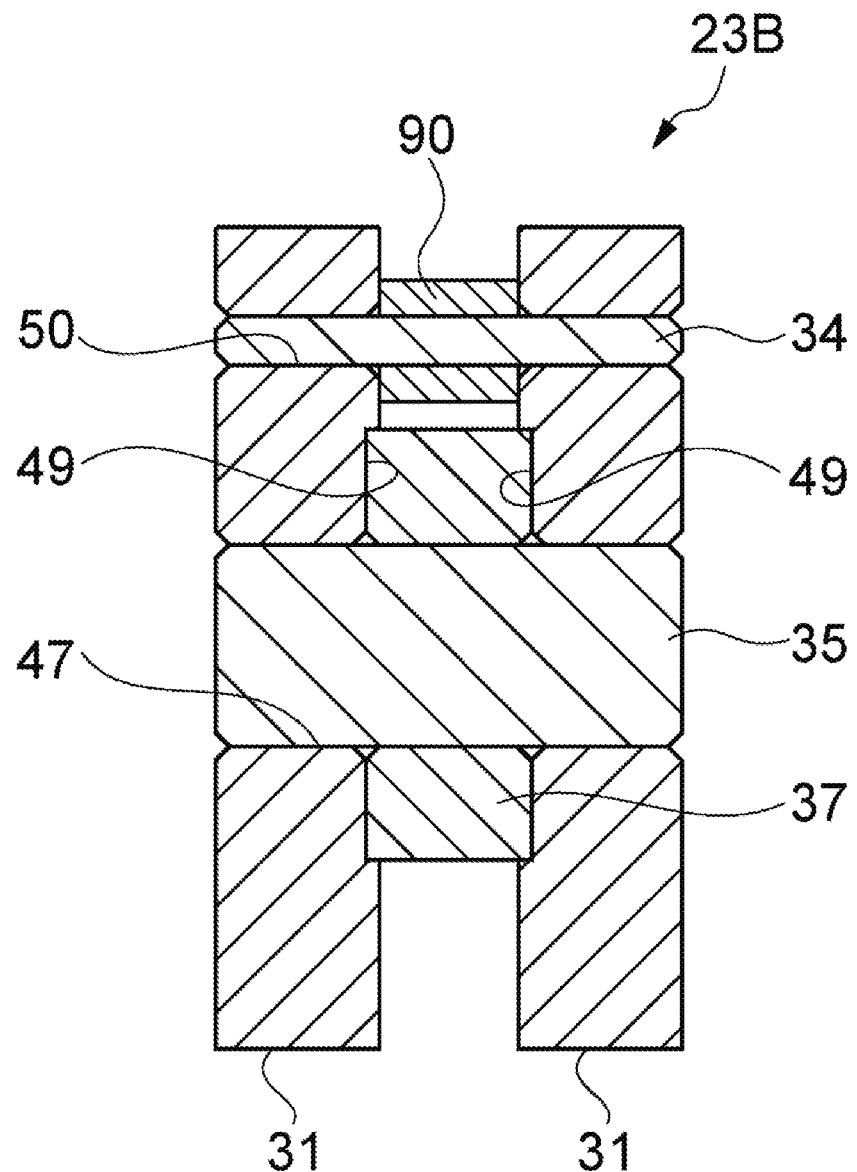
FIG. 11B is a cross-sectional view taken along line XI-XI of the pendulum illustrated in FIG. 11A.

FIG. 11A is a front view of the pendulum 23B, and FIG. 11B is a cross-sectional view taken along line XI-XI of the pendulum 23B illustrated in FIG. 11A.

The pendulum 23B of this configuration has the same configuration as that of the pendulum 23 of the first configuration example illustrated in FIG. 3B, except that the swinging shaft 34 is fitted in the through hole 50 formed in the pendulum piece 31 and the swinging shaft roller 90 is attached to the swinging shaft 34.

The swinging shaft 34 fitted to a pair of pendulum pieces 31, 31 is attached with the swinging shaft roller 90 on the outer periphery thereof. The outer peripheral surface of the swinging shaft roller 90 is in rolling-contact with the side wall 55a of the swinging shaft guide portion 55 (see FIG. 5) of the above-described pendulum support body 21. As a result, the swinging shaft roller 90 rolls on the side wall 55a, and the friction that hinders the pendulum movement, which is the swing motion of the pendulum 23B, is reduced. Therefore, as compared with the pendulum 23 of the first configuration example, the damping performance of the pendulum 23B can be further improved. The swinging shaft roller 90 can also be formed, using a sliding bearing or a rolling bearing.

<Fifth Configuration Example>

Next, a fifth configuration example of the centrifugal pendulum damper will be described.

Figure 12:
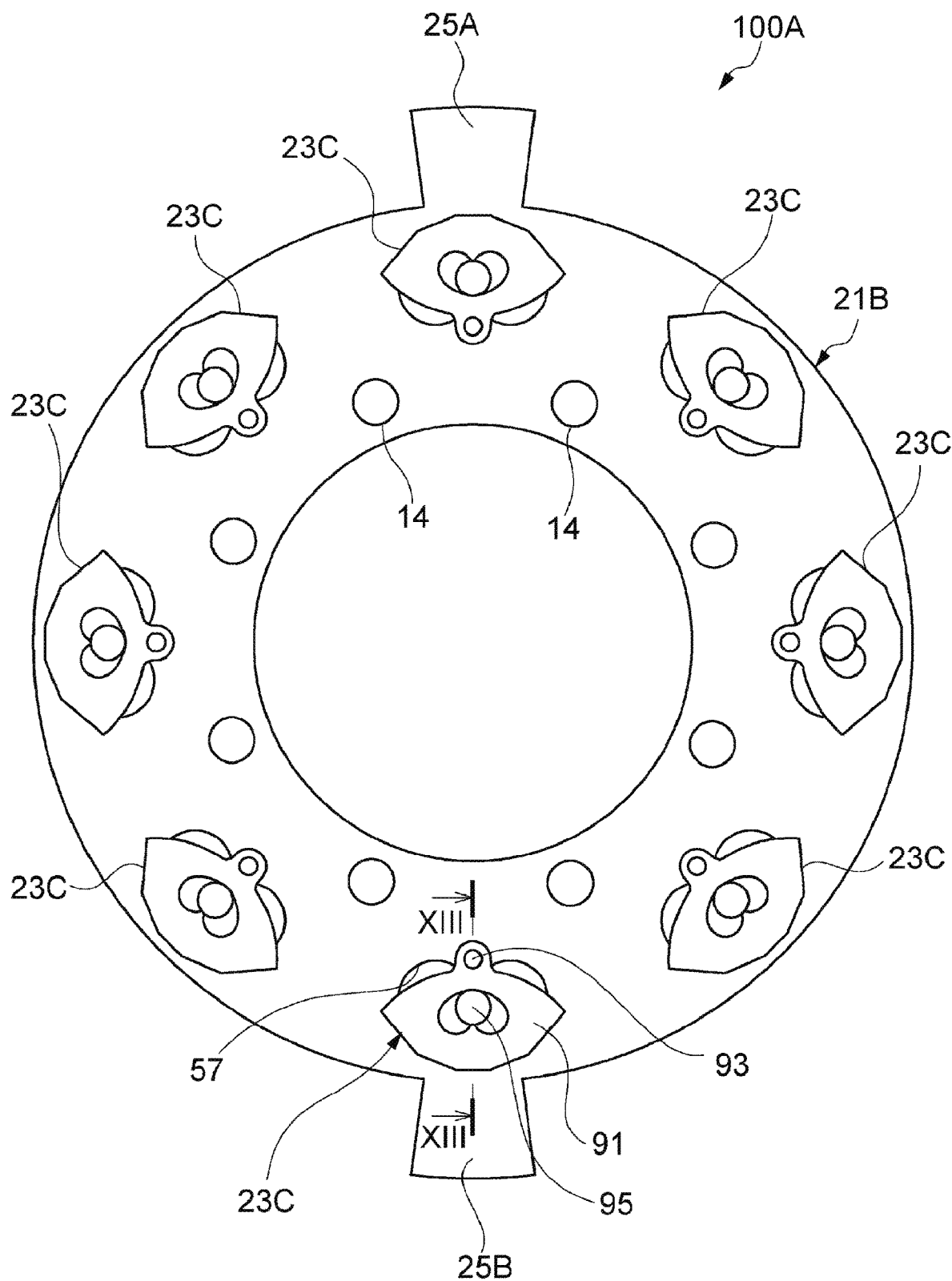
FIG. 12 is a plan view of a centrifugal pendulum damper of a fifth configuration example.
Figure 13A:
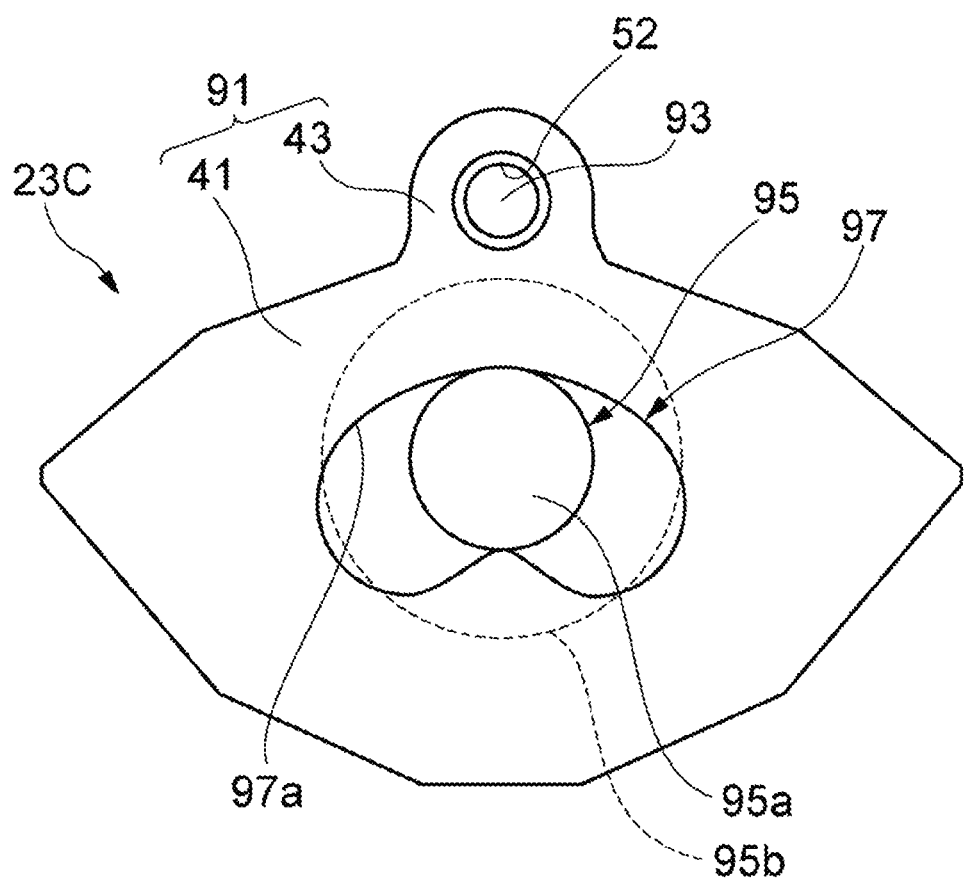
FIG. 13A is a front view of a pendulum of a fifth configuration example.

FIG. 12 is a plan view of the centrifugal pendulum damper 100A, FIG. 13A is a front view of the pendulum 23C, and FIG. 13B is a cross-sectional view taken along the line XIII-XIII of the pendulum support body 23C and the pendulum support body illustrated in FIG. 12.

A centrifugal pendulum damper 100A includes a pendulum support body 21B and a plurality of pendulums 23C provided on a pendulum support portion of the pendulum support body 21B. Leg portions 25A and 25B are provided on a part of the outer peripheral edge of the pendulum support body 21B in the same manner as described above.

The pendulum 23C includes a pair of pendulum pieces 91 having the same shape, a swinging shaft 93 for integrally connecting the pair of pendulum pieces 91, and a rolling shaft 95. The swinging shaft 93 serves as the swing center of the pendulum 23C, and both axial end portions thereof are inserted into the guide hole 52 of the pendulum piece 91. Further, the shaft central portion of the swinging shaft 93 is inserted into the swinging shaft guide portion 55 formed on the pendulum support body 21B with a gap in the radial direction.

The rolling shaft 95 includes a rolling shaft end portion 95a which is a pair of axial end portions, and a rolling shaft large diameter portion 95b of the rolling shaft central portion larger in diameter than the rolling shaft end 95a. At both axial end portions of the rolling shaft large diameter portion 95b, a pair of flange portions 95c protruding outward in the radial direction are formed. The flange portion 95c functions as a vibration preventing member in the axial direction from the pendulum support body 21B.

Further, the pendulum piece 91 is formed with a rolling shaft end guide portion 97 through which the rolling shaft end portion 95a is inserted. The outer peripheral surface of the rolling shaft end portion 95a makes rolling contact with the side wall 97a of the rolling shaft end guide portion 97. The rolling shaft large diameter portion 95b is guided to the rolling shaft guide portion 57 (see FIG. 12) formed on the pendulum support body 21B in the same manner as described above. That is, the rolling shaft large diameter portion 95b rolls along the side wall 57a (see FIG. 13B) on the outer peripheral side of the rolling shaft guide portion 57. Therefore, the pendulum piece 91 swings, while being guided by the three guide surfaces, that is, the side wall 57a of the rolling shaft guide portion 57, the side wall 97a of the rolling shaft end guide portion 97, and the side wall 55a of a swinging shaft guide portion 55 to be described later.

Figure 14A:
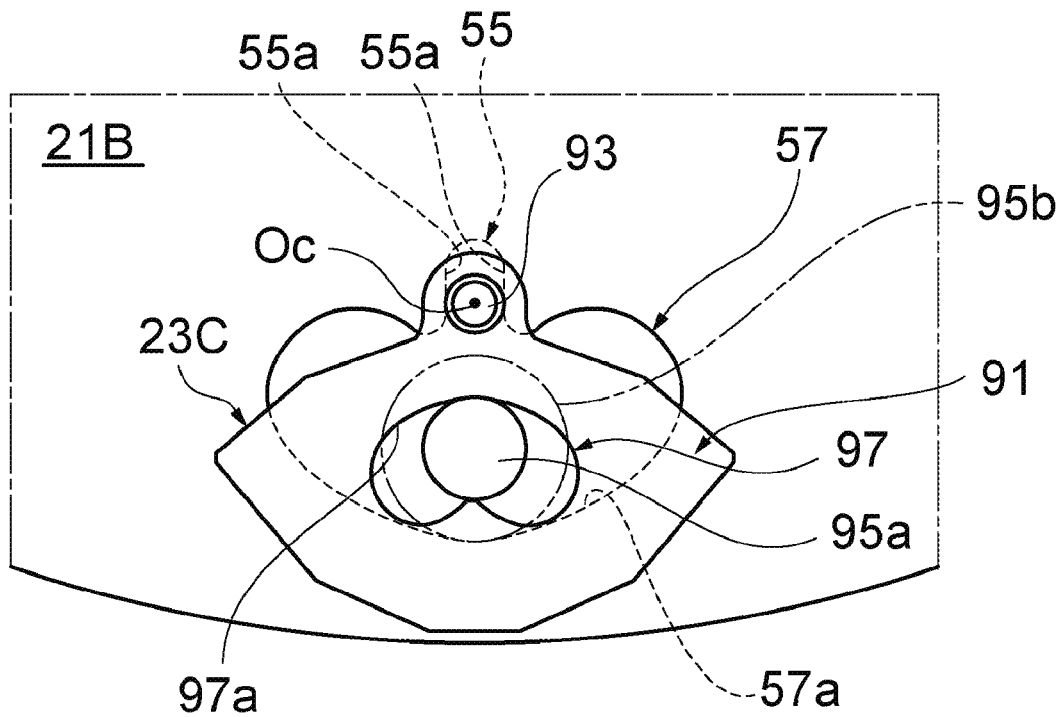
FIG. 14A is an explanatory diagram illustrating an aspect of swinging of the pendulum in a stepwise manner.
Figure 14B:
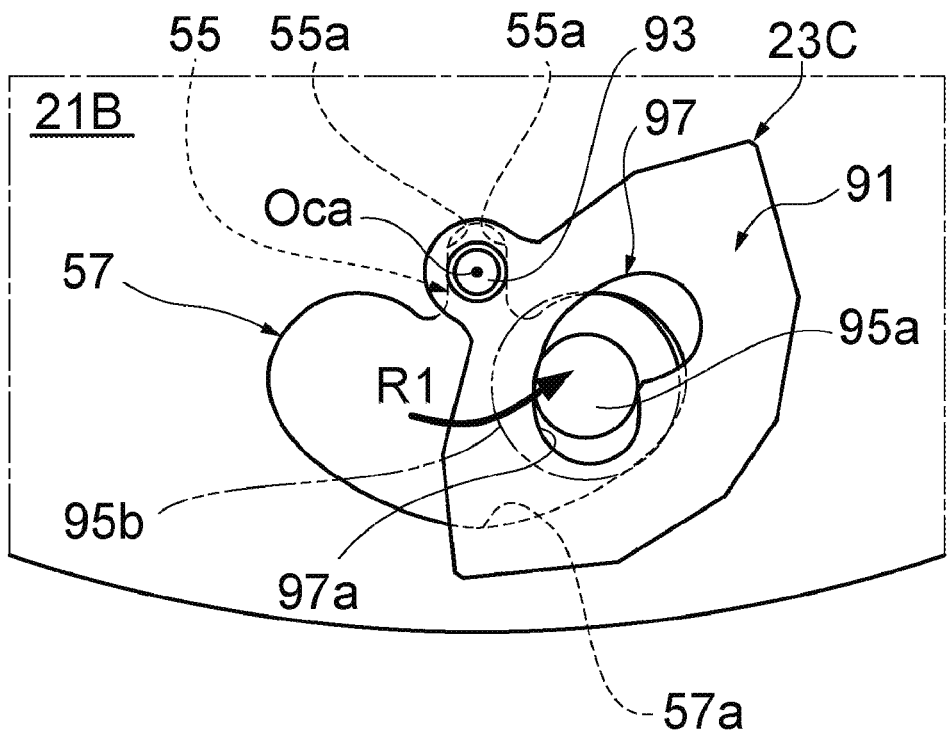
FIG. 14B is an explanatory diagram illustrating an aspect of swinging of the pendulum in a stepwise manner.
Figure 14C:
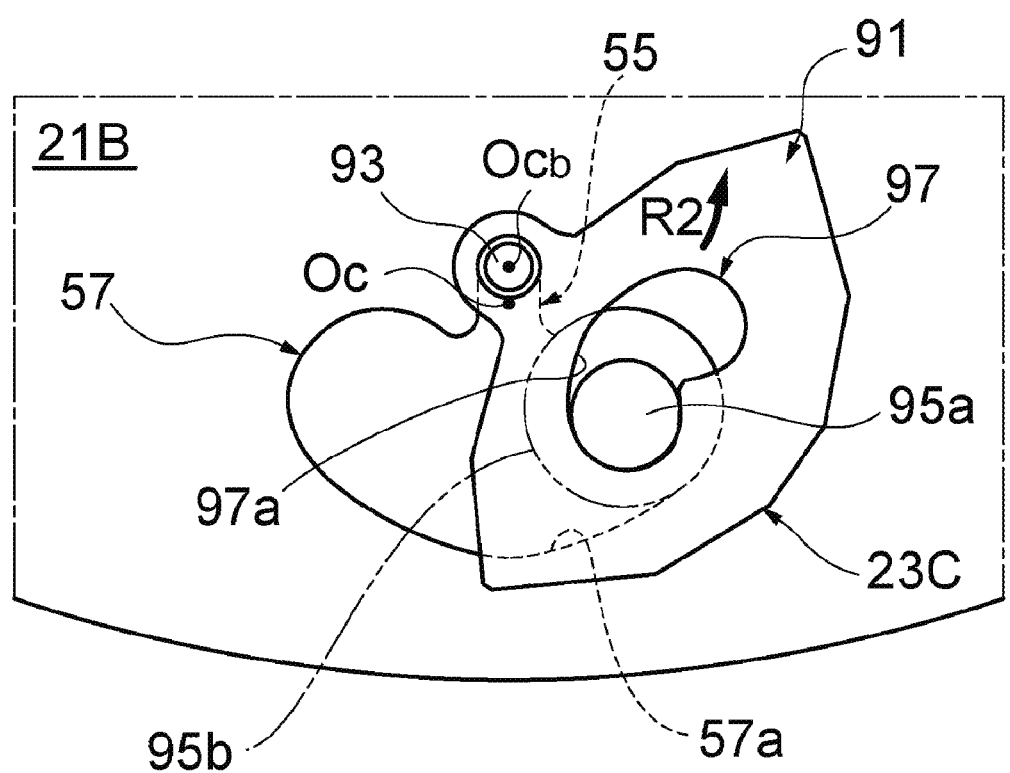
FIG. 14C is an explanatory diagram illustrating an aspect of swinging of the pendulum in a stepwise manner.

FIGS. 14A, 14B, and 14C are explanatory diagrams illustrating the manner of swing of the pendulum 23C stepwise.

When the rolling shaft large diameter portion 95b rolls on the rolling shaft guide portion 57 and the rolling shaft end portion 95a rolls on the rolling shaft end guide portion 97, the pendulum 23C swings about the swinging shaft 93. First, the rolling shaft large diameter portion 95b of the pendulum 23C illustrated in FIG. 14A moves toward one circumferential end portion of the rolling shaft guide portion 57 extending in the circumferential direction of the pendulum support member 21 as illustrated in FIG. 14B (swinging in the direction of the arrow R1). At the same time, the rolling shaft end portion 95a rolls along the side wall 97a of the rolling shaft end guide portion 97.

Then, the pendulum piece 91 of the pendulum 23C swings around the swinging shaft 93 along the side wall 57a on the outer peripheral side of the rolling shaft guide portion 57, and the oscillation angle of the pendulum piece 91 further increases due to the rolling along the side wall 97a of the rolling shaft end portion 95a.

Then, as illustrated in FIG. 14C, the rolling shaft large diameter portion 95b abuts against one circumferential end portion of the rolling shaft guide portion 57, and the rolling shaft end portion 95a abuts against one end portion of the side wall 97a. At this time, the pendulum piece 91 has the maximum oscillation angle (swinging in the direction of the arrow R2).

Here, in the case of the illustrated example, the swinging shaft 93 moves from the swing center Oc of the swinging shaft 93 before movement to the swing center Ocb in the radial direction via the swing center Oca during the movement. However, the movement direction of the swinging shaft 93 changes according to the shapes of the rolling shaft end guide portion 97 and the rolling shaft guide portion 57 formed.

According to the relationship between the movement of the swinging center and the radius of curvature of the side wall 97a of the rolling shaft end guide portion 97, the trajectory of the pendulum 23C becomes a trajectory that is likely to cause a pendulum movement of a constant period, similarly to the trajectory S2 illustrated in FIG. 8.

In the centrifugal pendulum damper 100A of this configuration, the rolling shaft 95 illustrated in FIG. 13B is formed only by the shaft body instead of the roller 37 illustrated in FIG. 3B described above. The rolling shaft 95 of this configuration is sandwiched between the side wall 57a of the rolling shaft guide portion 57 of the pendulum support body 21B and the side wall 97a of the rolling shaft end guide portion 97 of the pair of pendulum pieces 31 to roll. In the rolling shaft 95, the diameter of the rolling shaft 95 and the radius of curvature of the side walls 57a and 97a are set such that the side wall 57a of the pendulum support body 21B on which the rolling shaft large diameter portion 95b rolls and the side wall 97a of the pendulum piece 91 on which the rolling shaft end 95a rolls roll with equal circumferential length. Therefore, no slip occurs on each rolling surface, friction which hinders the pendulum movement of the pendulum 23C can be reduced, and the vibration damping performance can be further improved from the respective constitution examples described above. Further, the roller 37 described above is unnecessary for the rolling shaft 95, and the cost can be reduced.

<Sixth Configuration Example>

Next, a sixth structural example of the centrifugal pendulum damper will be described.

Figure 15:
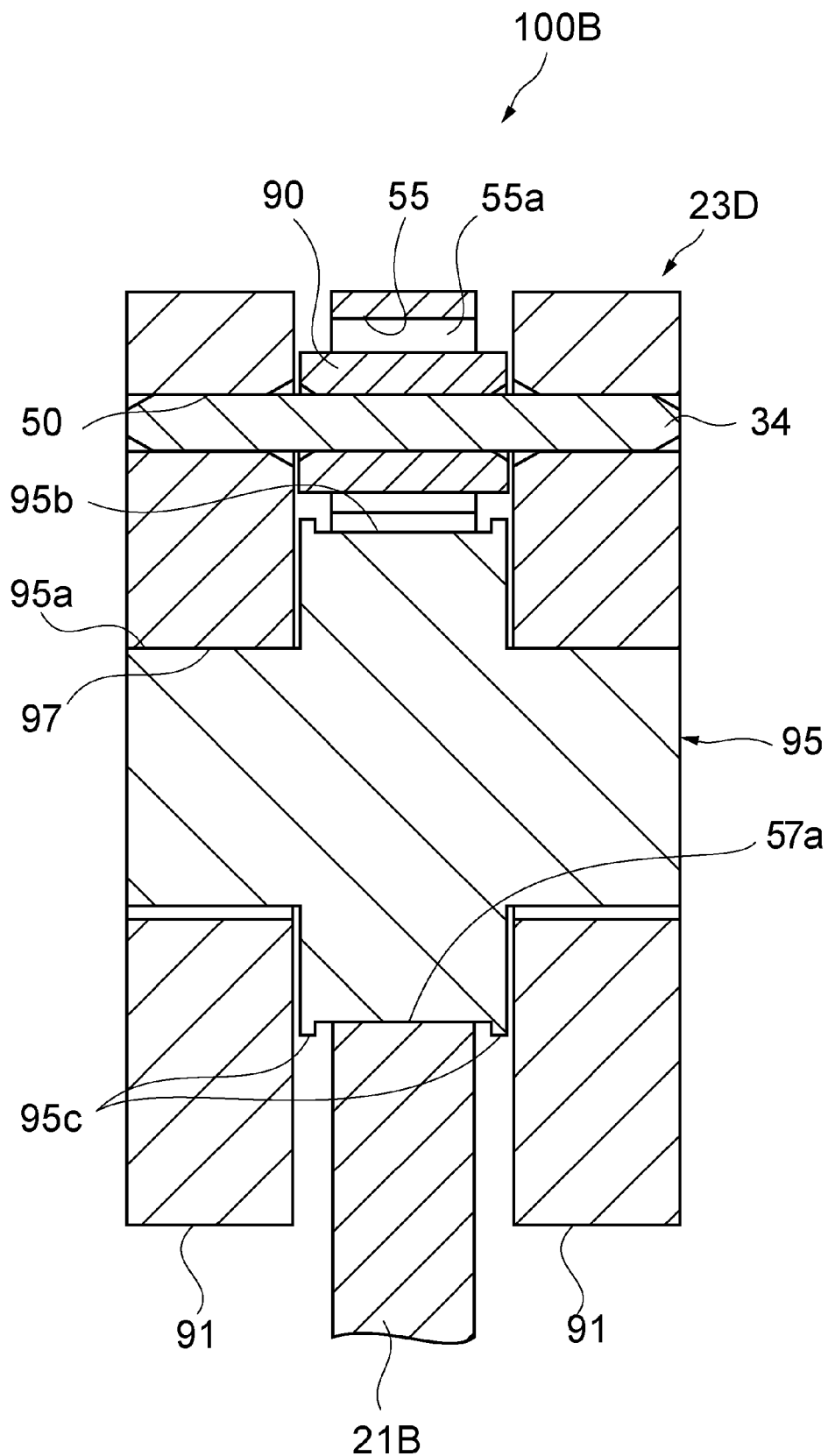
FIG. 15 is a cross-sectional view of a pendulum and a pendulum support body of the centrifugal pendulum damper of a sixth configuration example.

FIG. 15 is a sectional view of a pendulum 23D and the pendulum support body 21B of the centrifugal pendulum damper 100B.

The pendulum 23D of the centrifugal pendulum damper 100B of the present configuration is the same as the pendulum 23C of the fifth configuration example illustrated in FIGS. 13A and 13B, except that the swinging shaft roller 90 is attached to the swinging shaft 34 fitted to the through hole 50 formed in the pendulum piece 91.

In the present configuration, when the swinging shaft roller 90 is in rolling contact with the side wall 55a of the swinging shaft guide portion 55, the friction hindering the pendulum movement of the pendulum 23D is reduced and the vibration damping performance is further improved. Also in this configuration, the roller 37 described above is unnecessary for the rolling shaft 95, and the cost can be reduced.

The roller 37 and the swinging shaft roller 90 described above may be made of metal or resin. When the roller is made of resin, it is possible to alleviate the generation of sound due to the contact between the roller and the pendulum support body. In addition, in the case where the generation of sound due to the contact between the swinging shaft and the pendulum support body becomes a problem, it is preferable to apply resin coating to at least one of the contact surfaces or to adopt a resin swinging shaft. In the case where the roller is made of metal, when the lubricity between the roller and the pendulum support body is insufficient, it is preferable to subject the lubrication treatment to at least one of the contact surfaces. For example, a roller coated with a lubricant such as grease may be adopted.

Further, the swinging shaft guide portion and the rolling shaft guide portion are not limited to through holes, but may be formed, for example, by recessed grooves or the like.

<Seventh Configuration Example>

Figure 16:
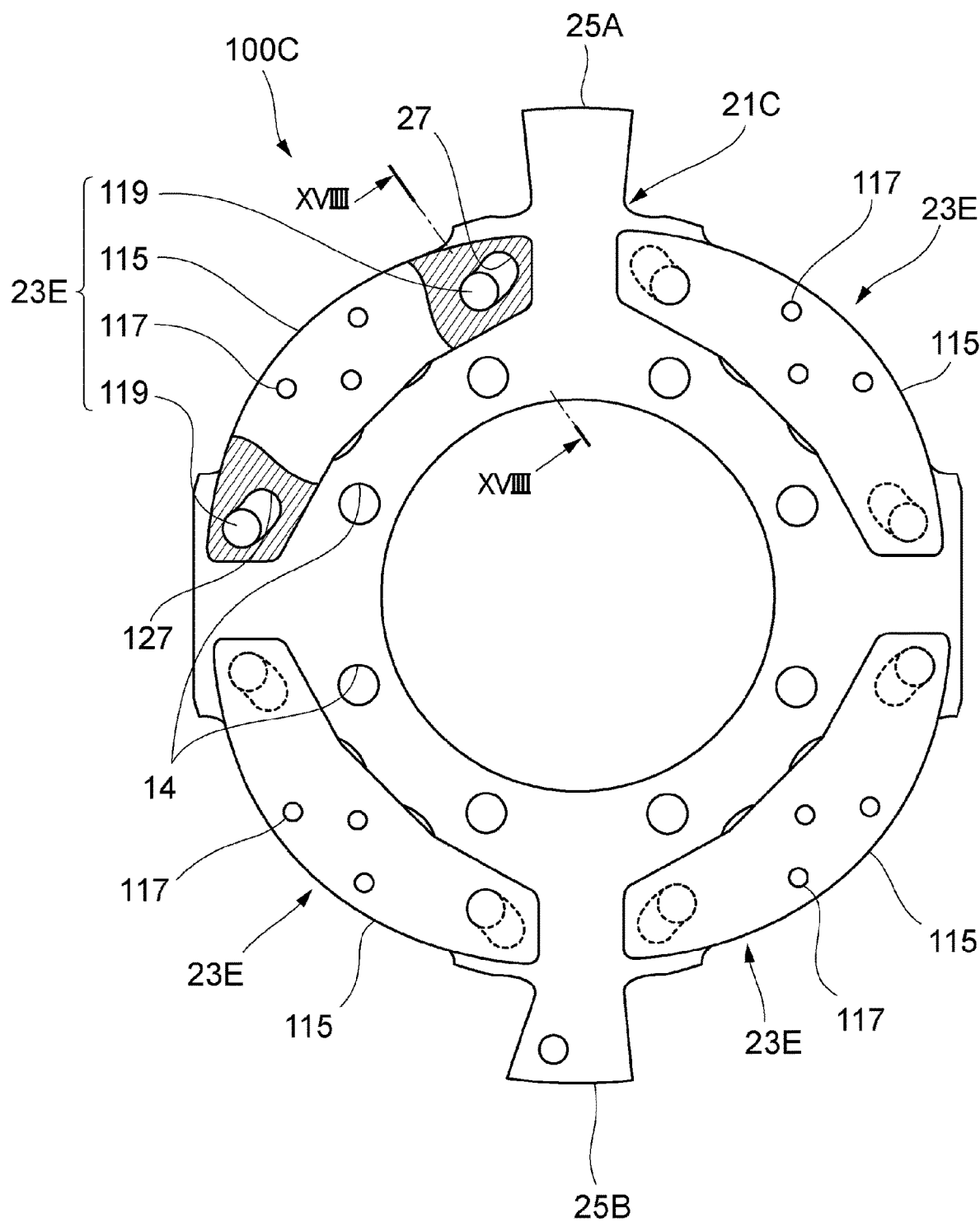
FIG. 16 is a front view of the centrifugal pendulum damper of the first configuration example.

FIG. 16 is a front view of the centrifugal pendulum damper of the seventh configuration example.

The centrifugal pendulum damper 100C includes a pendulum support body 21C, and a plurality of pendulums 23E attached to the pendulum support body 21C.

Figure 17:
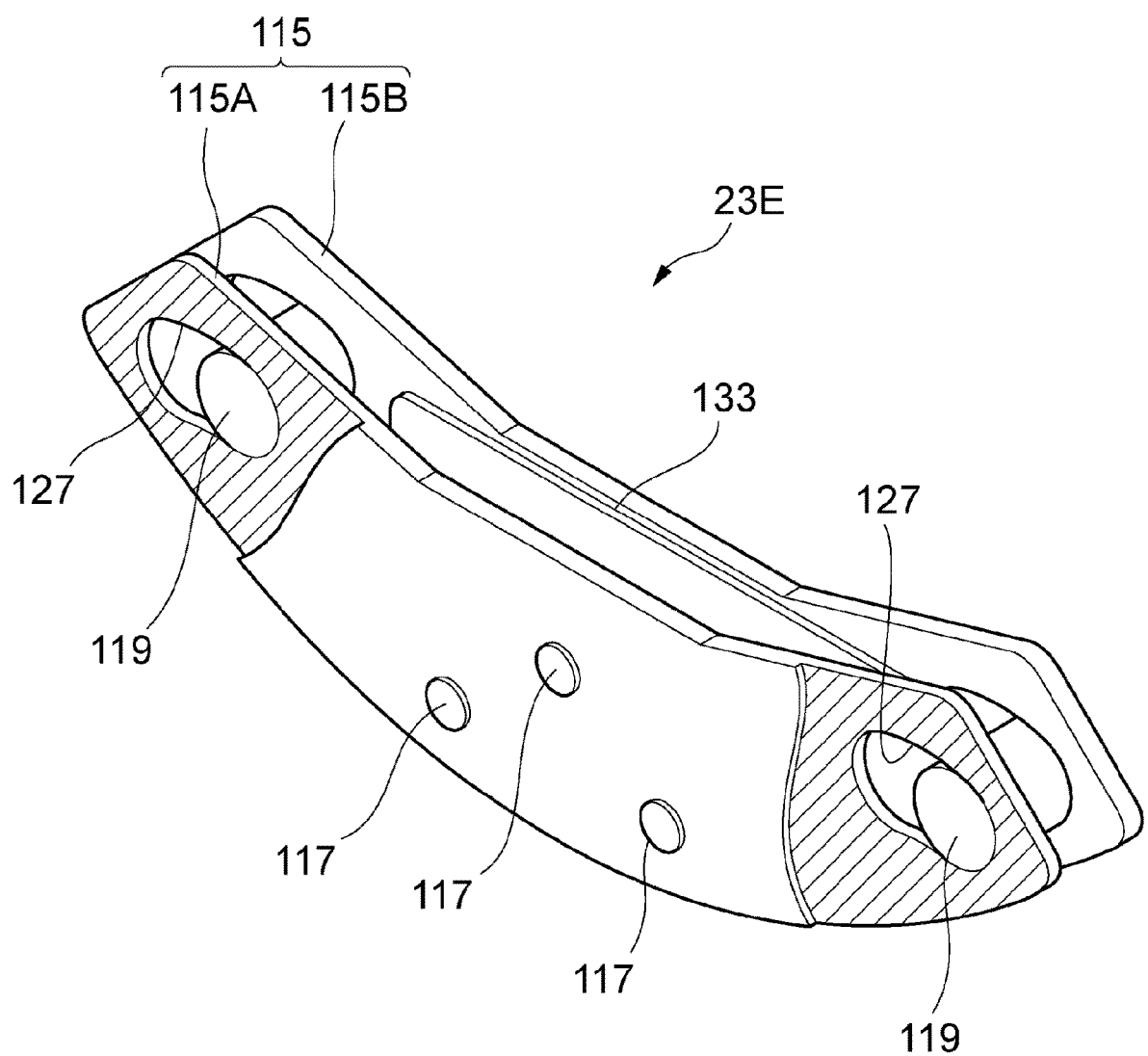
FIG. 17 is a perspective view illustrating the pendulum illustrated in FIG. 16 as a single body.

FIG. 17 is a perspective view illustrating the pendulum 23E illustrated in FIG. 16 as a single body.

The pendulum 23E includes a pair of pendulum masses 115 (115A, 115B in FIG. 17) coupled to each other with the pendulum support body 21C sandwiched in the axial direction, and a rolling element 119. The pair of pendulum mass bodies 115A and 115B are coupled to each other by a connecting element 117.

The pendulum support body 21C includes a plurality of fixing holes 14 for power transmission on a concentric circle. The pendulum support body 21C is coaxially fixed to a flywheel (not illustrated) by these fixing holes 14. In addition, the pendulum support body 21C includes a pair of legs 25A and 25B and abuts against an elastic member (not illustrated) provided in the power transmission path as described above.

A plurality of pendulums 23E is swingably attached to the pendulum support body 21C. In the illustrated example, four pendulums 23E are provided as an example. A support hole 125 (see FIG. 18) corresponding to each pendulum 23E is formed in the pendulum support body 21C, and the pendulum 23E is supported in the support hole 125. The pendulum 23E supported by the pendulum support body 21C can reciprocate along the circumferential direction of the pendulum support body 21C, that is, swingable around the support hole 125.

The pair of pendulum masses 115A and 115B are arranged so as to sandwich the pendulum support body 21C therebetween, and are plate-shaped members having the same arc shape.

The coupling element 117 connects the pair of pendulum mass bodies 115A and 115B in a state of being overlapped in the thickness direction. The pair of pendulum mass bodies 115A and 115B are sandwiched between, for example, spacers 133 (see FIG. 17) and collars or the like between the opposing faces thereof, and are fixed to each other by a connecting element 117 such as a pin or a rivet.

On the opposing surfaces of the pair of pendulum mass bodies 115A and 115B facing each other, recessed grooves 127 having the same shape along the arc are formed at arcuate end portions of the arc-shaped pendulum mass bodies 115A and 115B, respectively. Each of the recessed grooves 127 is a rolling element support portion into which the shaft end portion 129 of the rolling element 119 is inserted, and the shaft end portion 129 is supported so as to be able to roll along the extending direction of the recessed groove 127, and to be movable in the axial direction. In addition, a part of the pendulum 23E in FIGS. 16 and 17 illustrates a recessed groove 127 by notching a part of the pendulum mass body 115 in the thickness direction.

Figure 18:
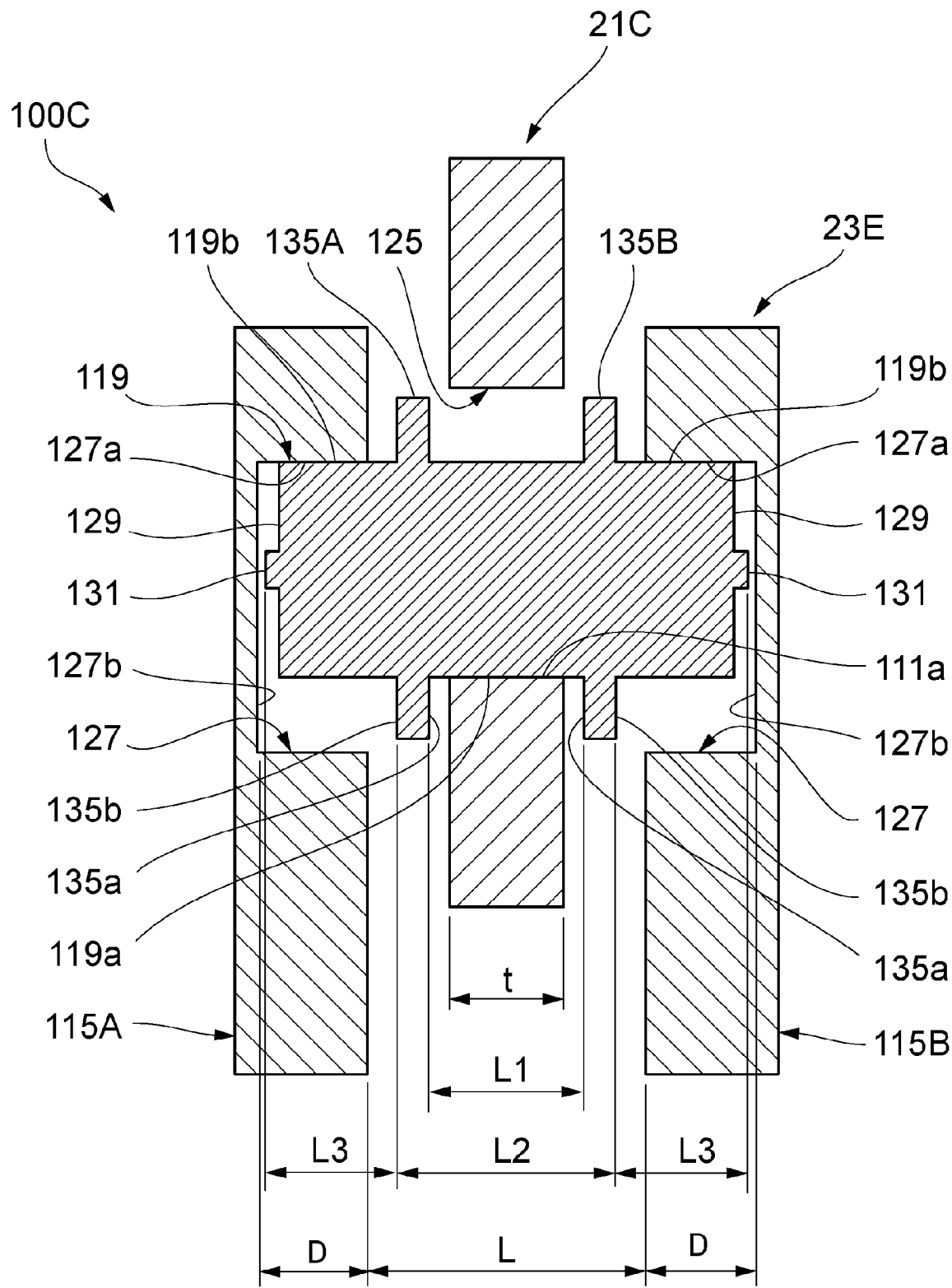
FIG. 18 is a cross-sectional view of a main part taken along line XVIII-XVIII in FIG. 16, illustrating a state in which the pendulum support body and the pendulum are in a neutral positional relationship.
Figure 19:
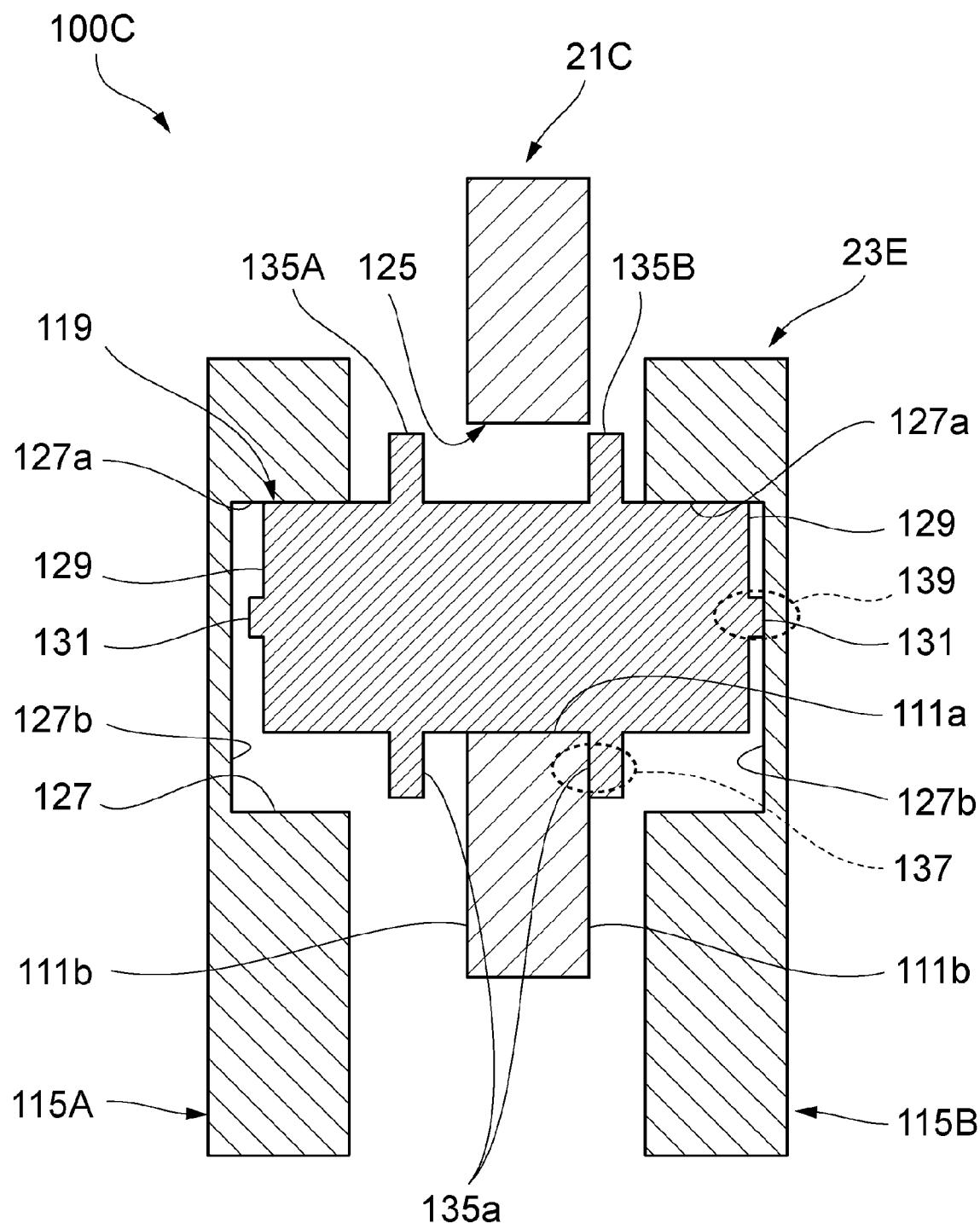
FIG. 19 is a cross-sectional view of a main part along the line XVIII-XVIII of FIG. 16, illustrating a state in which the pendulum is shifted to one side in the axial direction with respect to the pendulum support body.

FIGS. 18 and 19 are cross-sectional views of the main part taken along line XVIII-XVIII in FIG. 16. FIG. 18 is a sectional view illustrating a state in which the pendulum support body 21C and the pendulum 23E are in a neutral positional relationship, and FIG. 19 is a sectional view illustrating a state in which the pendulum 23E is closer to one side in the axial direction with respect to the pendulum support body 21C.

In each of the pair of pendulum mass bodies 115A and 115B, a recessed groove 127 is formed on opposing surfaces that face each other. A shaft end portion 129 of the rolling element 119 is inserted into the recessed groove 127. In the recessed groove 127, a groove inner wall surface 127a which is on the outer diameter side (the upper side in the drawing) of the pendulum support body 21C serves as a trajectory surface on which the shaft end portion 129 of the rolling element 119 rolls. Also, in the support hole 125 of the pendulum support body 21C, the inner wall surface 111a on the inner diameter side (lower side in the figure) of the pendulum support body 21C serves as a trajectory surface on which the rolling element 119 rolls. That is, the rolling element 119 is supported so as to roll between the groove inner wall surface 127a of the recessed groove 127 and the inner wall surface 111a of the support hole 125.

The rolling element 119 is provided between the pendulum support body 21C and the pendulum mass body 115A and between the pendulum support body 21C and the pendulum mass body 115B in a pair of annular guide portions 135A and 135B. The pair of annular guide portions 135A and 135B are provided so as to protrude radially outward from the outer peripheral surface of the rolling element 119. Convex portions 131 projecting outward in the axial direction are provided on the shaft end portions 129 on both axial sides of the rolling element 119 on the rotational axis center of the rolling element 119. The groove bottom surface 127b of each of the recessed grooves 127 formed in the pendulum masses 115A and 115B serves as a butting portion against which the convex portion 131 provided on each shaft end portion 129 of the rolling element 119 abuts.

In the pair of annular guide portions 135A and 135B, a separation distance L1 between the guide inner side surfaces 135a is larger than an axial thickness t of the pendulum support body 21C. A distance L2 between the guide outer surfaces 135b of the pair of annular guide portions 135A and 135B is smaller than the distance L between the pair of pendulum masses 115A and 115B fixed by the connecting element 117. A distance L3 from the guide outer surface 135b of the rolling element 119 to the convex portion 131 of the shaft end portion 129 is larger than the depth D of the recessed groove 127.

The rolling element 119 is supported by the pendulum mass body 115A and 115B such that the shaft end portion is rotatable and movable in the axial direction by the above configuration. The outer peripheral surface between the pair of annular guide portions 135A and 135B of the rolling element 119 abuts against the inner wall surface 111a of the support hole 125 in a state of being inserted through the support hole 125 of the pendulum support body 21C.

In the neutral state of the pendulum support body 21C and the pendulum 23E illustrated in FIG. 18, the convex portion 131 and the groove bottom surface 127b are spaced apart in the axial direction, and the annular guide portions 135A and 135B and the pendulum support body 21C are spaced part from each other in the axial direction. On the other hand, in a state in which the pendulum 23E is closer to one side in the axial direction with respect to the pendulum support body 21C illustrated in FIG. 19, the pendulum 23E includes a guide inner side surface 135a of the annular guide portion 135B behind the displacement direction of the pendulum 23E abuts against the side surface 111b of the pendulum support body 21C at the position of the sliding contact portion 137. The groove bottom surface 127b of the pendulum mass body 115B behind the displacement direction abuts against the convex portion 131 formed on the shaft end portion 129 on the rear side in the displacement direction of the rolling element 119 at the position of the sliding contact portion 139.

In the case where the pendulum 23E comes close to the opposite side in the axial direction of the state illustrated in FIG. 19, similarly to the above, the convex portion 131 of the rolling element 119 abuts against the groove bottom surface 127b of the pendulum mass body 115A or the guide inner side surface 135a of the annular guide portion 135A abuts against the side surface 111b of the pendulum support member 21C.

Next, the operation of the above configuration will be described.

As illustrated in FIG. 16, the pendulum 23E reciprocates (swings) along the circumferential direction of the pendulum support body 21C to attenuate the rotational vibration. At the same time, the annular guide portions 135A and 135B prevent interference between the pendulum support body 21C and the pendulum masses 115A and 115B.

As illustrated in FIG. 19, when the pendulum 23E is displaced along the axial direction, the annular guide portion 135B, which is on the rear side in the displacement direction, abuts against the side surface 111b of the pendulum support body 21C, and furthermore, the convex portion 131 of the shaft end portion 129 of the rolling element 119 abuts against the groove bottom surface 127b of the pendulum mass body 115B. As a result, further displacement in the axial direction of the pendulum 23E with respect to the pendulum support body 21C is restricted.

Figure 22A:
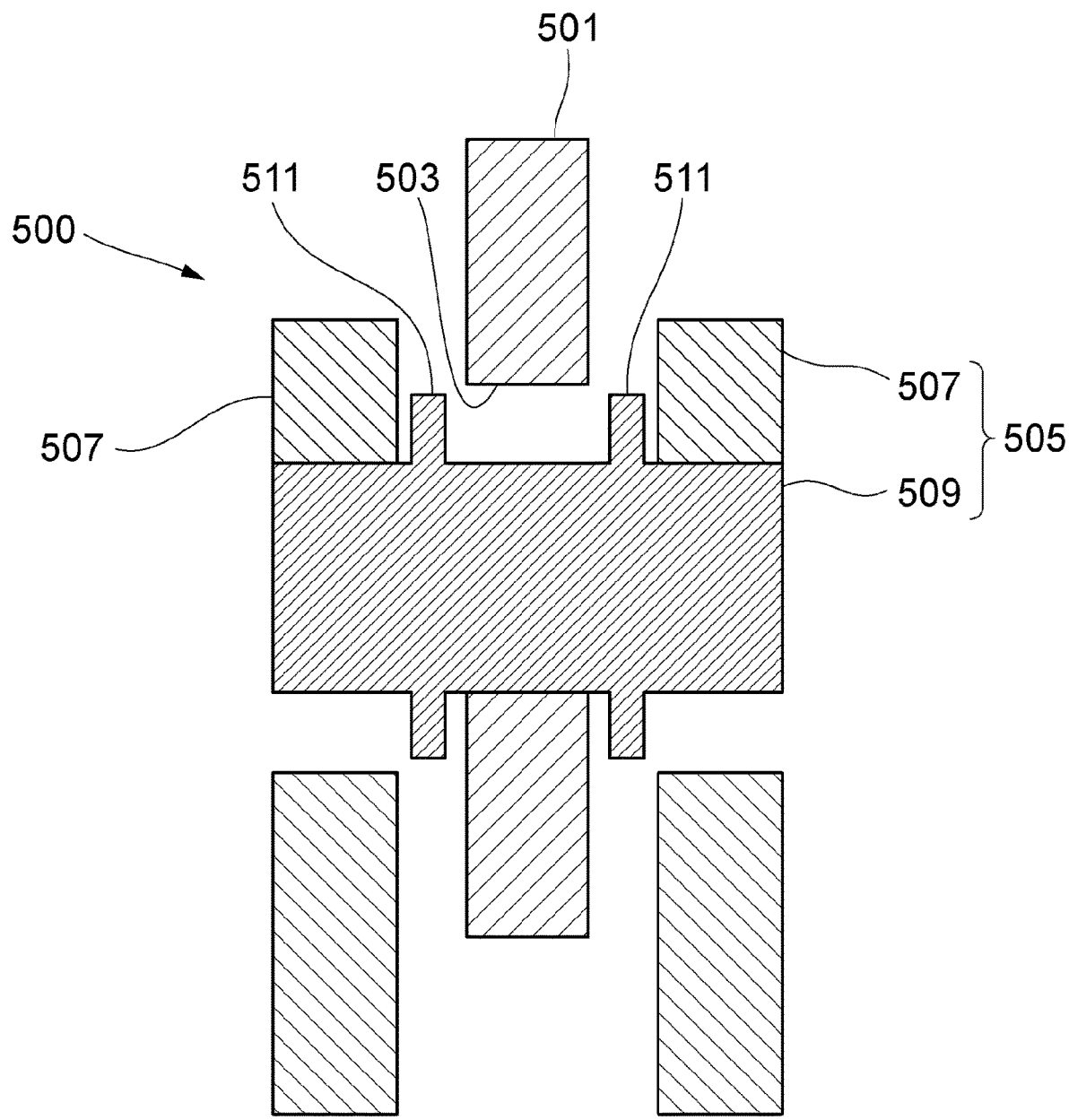
FIG. 22A is a cross-sectional view of a main part illustrating a state in which the pendulum support body and the pendulum are in a neutral positional relationship in a centrifugal pendulum damper of the related art.
Figure 22B:
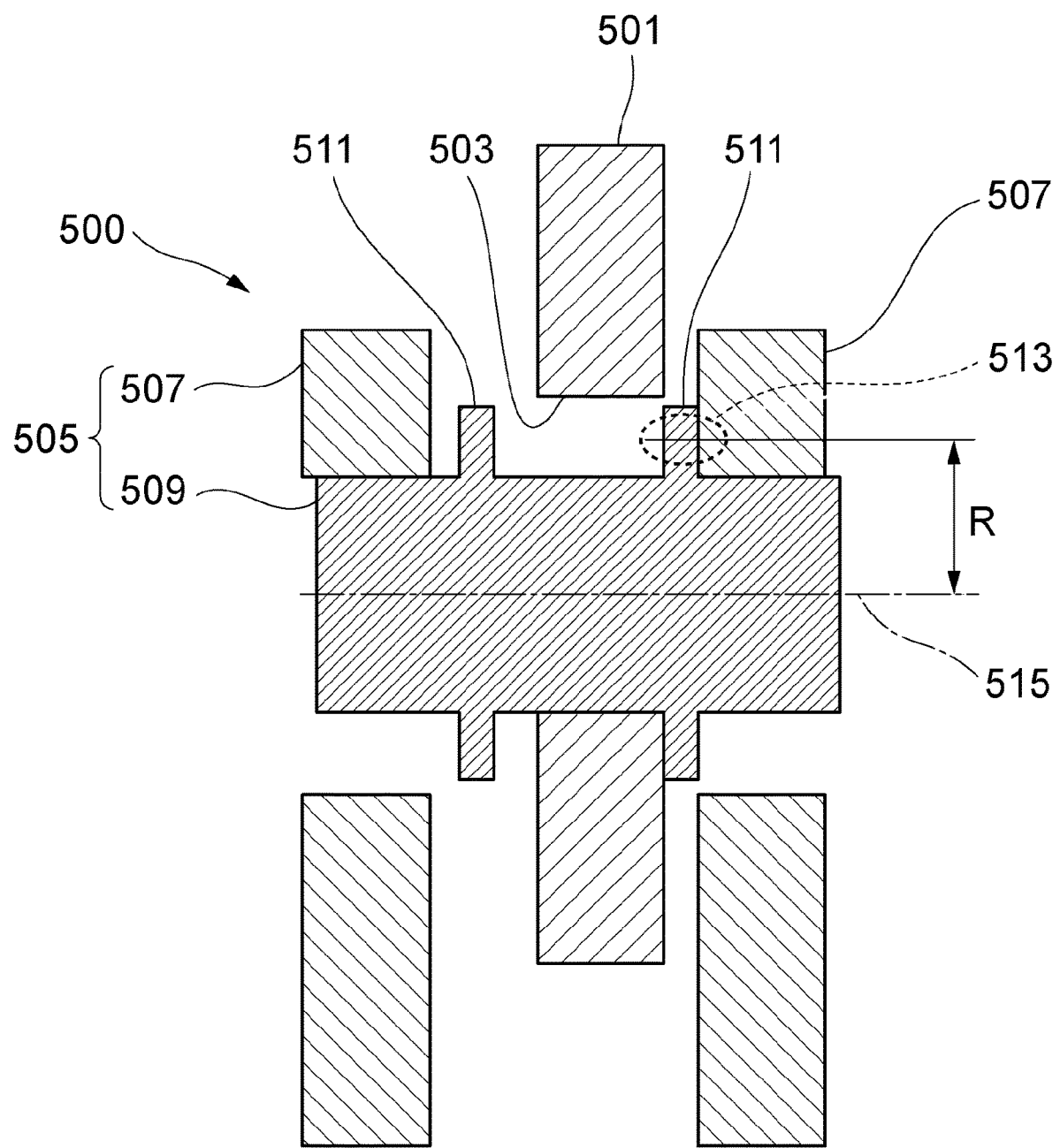
FIG. 22B is a cross-sectional view of a main part in a state in which the pendulum is closer to one side in the axial direction with respect to the pendulum support body of FIG. 22A.

In the configuration of the related art, in the same situation as FIG. 19 illustrated in FIG. 22B, the sliding contact portion 513 of the annular guide portion 511 of the rolling element 509 on the side away from the rotation center of the pendulum support body 501 abuts against the pendulum mass body 507. In this case, the distance R from the rotation axis 515 of the rolling element 509 to the sliding contact portion 513 increases, and the frictional torque generated at the sliding contact portion 513 of the rolling element 509 becomes the resistance of the swing motion of the pendulum 505. As a result, the vibration damping force by the pendulum 505 decreases.

In contrast, in this configuration, as illustrated in FIG. 19, the convex portion 131 provided on the rotation axis center of the shaft end portion 129 of the rolling element 119 abuts against the groove bottom surface 127b of the pendulum mass body 115B. In other words, the frictional torque due to rolling increases as the abutment portion on which the convex portion 131 abuts against the pendulum mass bodies 115A and 115B increases as the distance from the rotation axis of the rolling element 119 increases. However, according to the centrifugal pendulum damper 100C of this configuration, the convex portion 131 of the rolling element 119 is disposed coaxially with the rotation axis center at the shaft end portion of the rolling element 119. Therefore, the frictional torque applied to the pendulum masses 115A and 115B from the rotating rolling element 119 is minimized. As a result, the friction of the abutment portion is hard to influence the swing motion of the pendulum 23E, and the vibration absorbing function due to the pendulum 23E is not impaired.

Furthermore, in the centrifugal pendulum damper 100C of this configuration, the recessed groove 127 is formed within the thickness of the pendulum masses 115A and 115B. When a lubricant is used, the recessed groove 127 also functions as a lubricant pocket into which the lubricant enters the cavity of the recessed groove 127 and stably supplies the lubricant to the sliding portion.

<Eighth Configuration Example>

Next, an eighth configuration example of the centrifugal pendulum damper will be described.

In the centrifugal pendulum damper of the eighth configuration example, the convex portion 131 of the rolling element 19 in the centrifugal pendulum damper 100C of the seventh configuration example described above is constituted by pin tips of pins built in the rolling element 119. Except for this, the configuration is similar to that of the seventh configuration example.

Figure 20A:
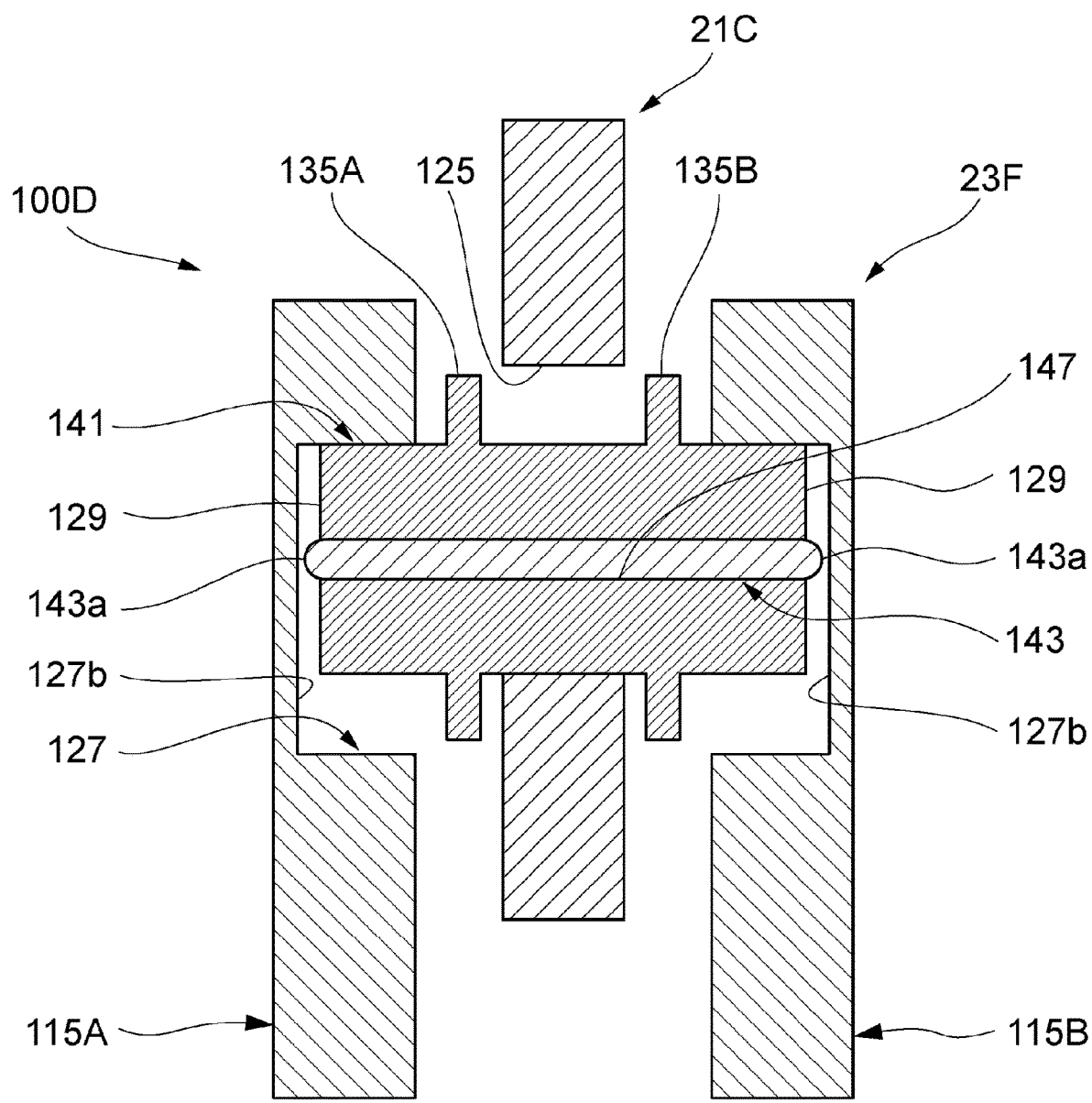
FIG. 20A is a cross-sectional view of a main part illustrating a state in which the pendulum support and the pendulum are in a neutral positional relationship, in the centrifugal pendulum damper of the second configuration example in which the pin is press-fitted into the rolling element.
Figure 20B:
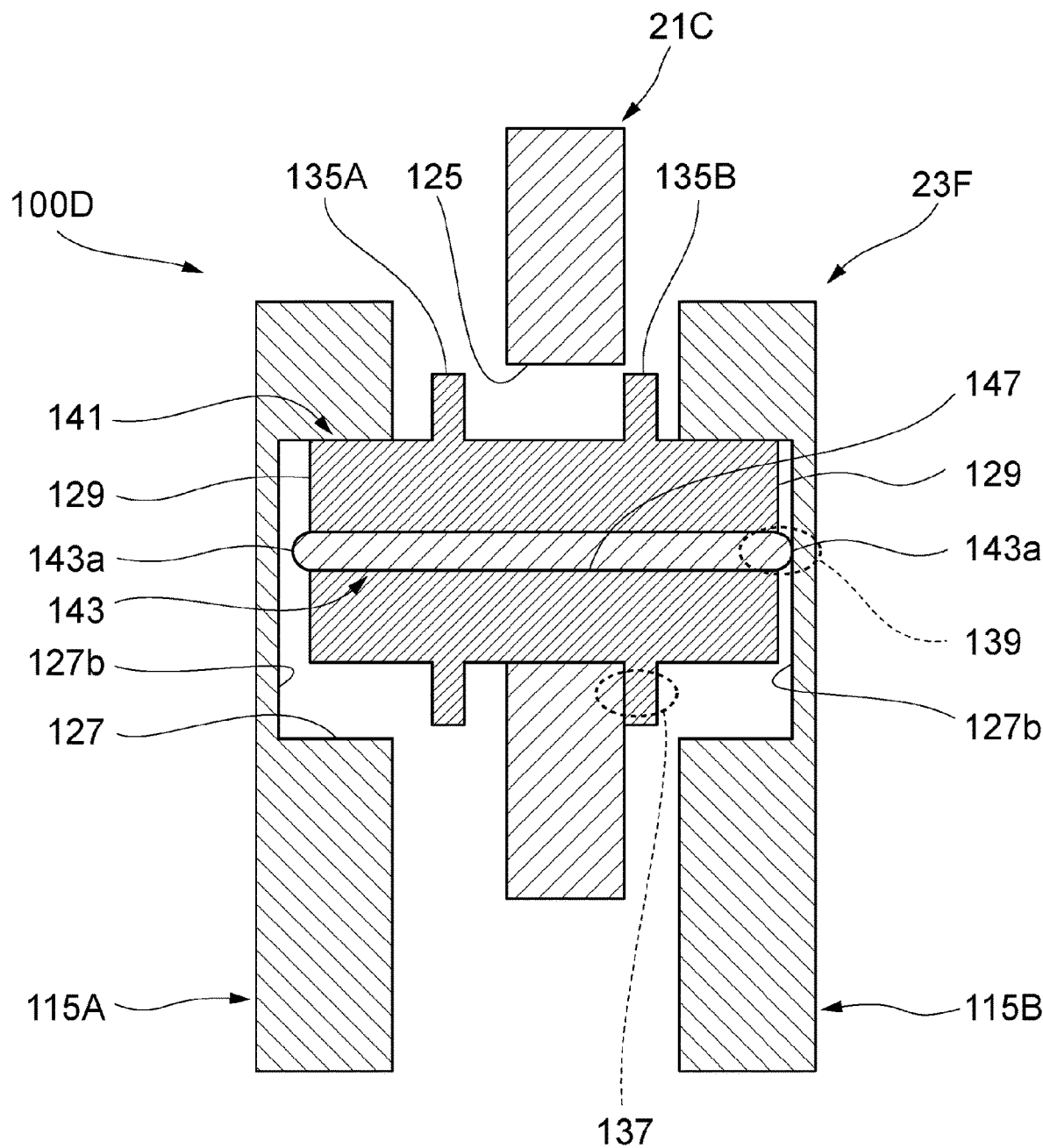
FIG. 20B is a cross-sectional view of a main part in a state in which the pendulum is shifted to one side in the axial direction with respect to the pendulum support body of FIG. 20A.

FIG. 20A is a cross-sectional view of a main part in which the pendulum support body and the pendulum are in a neutral positional relationship, and FIG. 20B is a cross-sectional view of the main part in a state in which the pendulum is closer to one side in the axial direction with respect to the pendulum support body of FIG. 20A.

In a centrifugal pendulum damper 100D of the present configuration, a fitting hole 147 is formed in the rotation axis of the rolling element 141. Both ends of the pin 143 protrude axially outward from the shaft end portion 129 of the rolling element 141 by inserting the pin 143 through the fitting hole 147. The distal end surfaces 143a at both axial ends of the pin 143 are formed in a curved shape, respectively, and protrude like the above-described convex portion 131 (see FIG. 19).

In the centrifugal pendulum damper 100D, when the pendulum 23F is displaced in the axial direction, the distal end surface 143a of the pin 143 at the shaft end portion 129 of the rolling element 141 is displaced toward the pendulum mass body 115B behind the movement direction of the pendulum 23F at the position of the sliding contact portion 139 against the groove bottom surface 127b (pressing portion). Further, an annular guide portion 135B on the rear side in the movement direction of the pendulum 23F abuts against the pendulum support body 21C at the position of the sliding contact portion 137, which is located on an inner side in the radial direction of the pendulum support body 21C (lower side in the drawing) than the support hole 125.

According to the centrifugal pendulum damper 100D of the present configuration, the same operational effects as those of the seventh configuration example can be obtained. Also, as illustrated in FIG. 18, in the case where the convex portion 131 is provided on the shaft end portion 129 of the rolling element 131, a complicated process such as a cutting process is required for the convex portion 131, but in comparison with this, the convex portion can be provided in a simple process of simply pressing the pin 143 into the fitting hole 147. Further, by using the pin 143 which is a separate member from the rolling element 141, the degree of freedom in selecting the material of the convex portion is enhanced. In particular, if the pin 143 having high wear resistance is used, the durability of the centrifugal pendulum damper 100D can be further improved. Further, it is possible to selectively use a material that reduces the friction between the pendulum mass body 115A and 115B and the pin 143.

Furthermore, since the distal end surface 143a of the pin 143 has a curved shape, the centrifugal pendulum damper 100D comes into point-contact with the pendulum mass body 115. As a result, the contact friction between the shaft end portion 129 and the pendulum mass body 115 of the pin 143 can be reduced as compared with the case of surface contact or line contact, and the vibration damping function can be further enhanced.

<Ninth Configuration Example>

Next, a ninth configuration example of the centrifugal pendulum damper will be described.

Figure 21A:
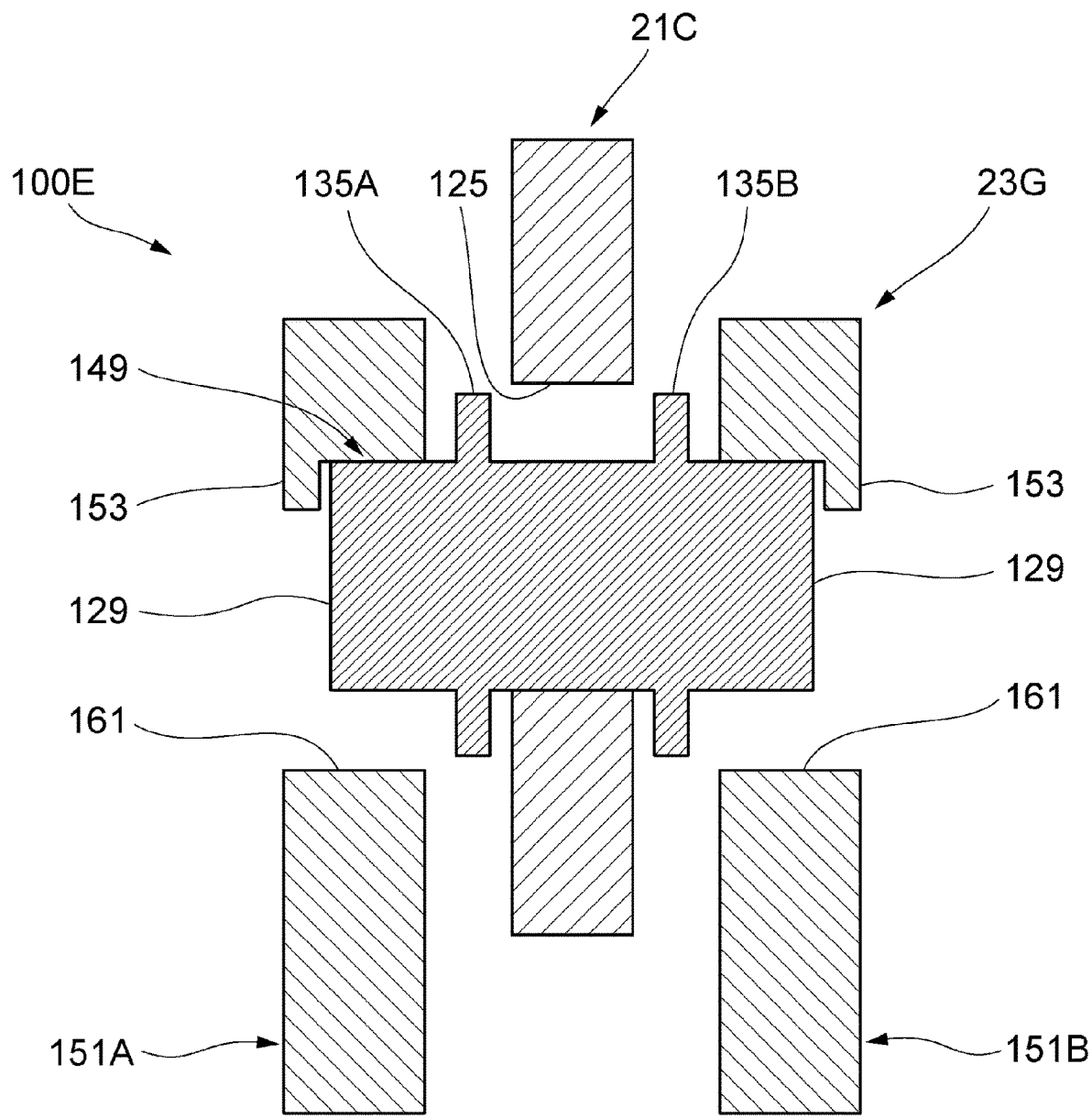
FIG. 21A is a cross-sectional view of a main part illustrating a state in which a pendulum support body and a pendulum are in a neutral positional relationship in a centrifugal pendulum damper of a third configuration example in which the pendulum mass body includes a flange portion.
Figure 21B:
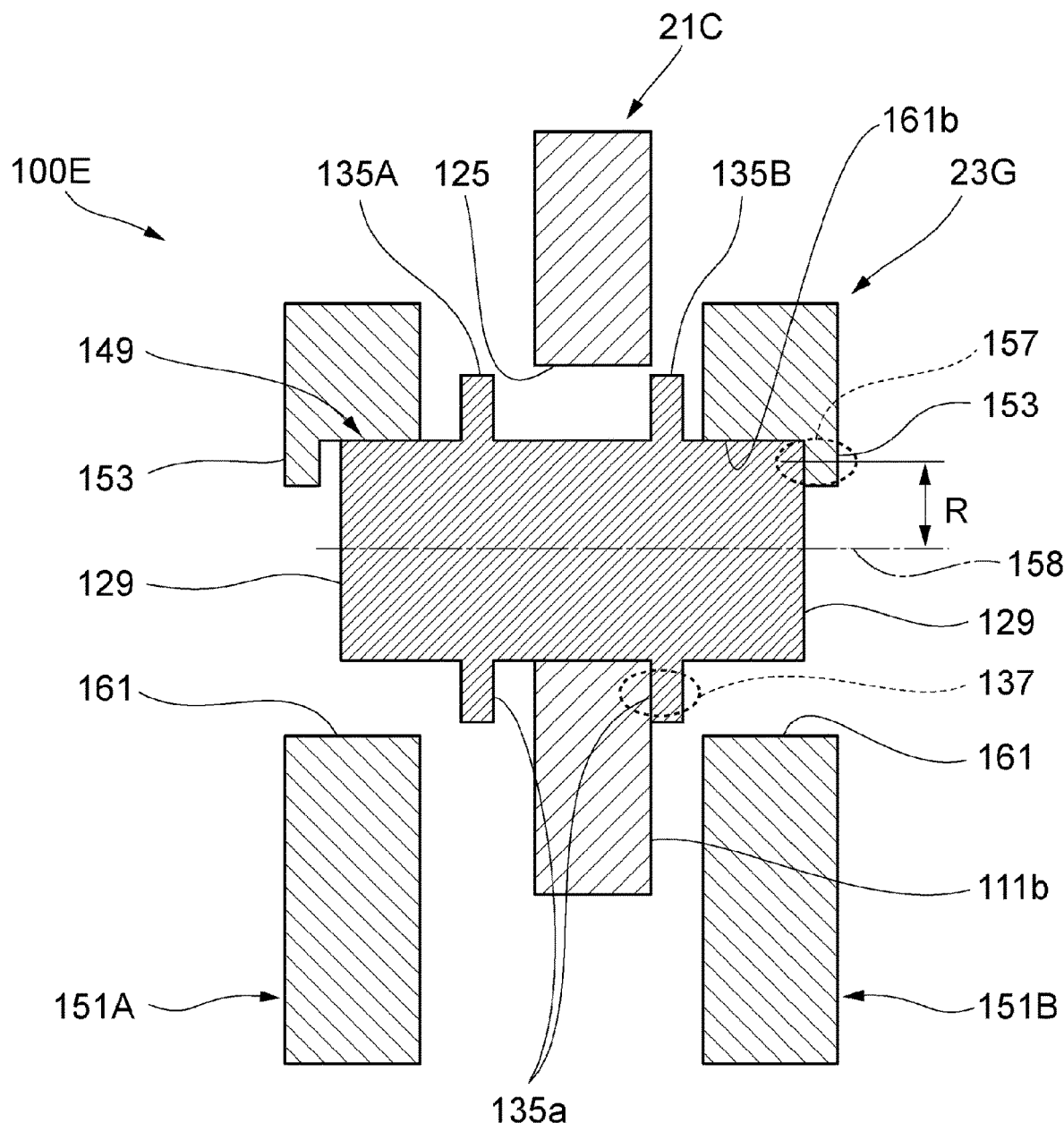
FIG. 21B is a cross-sectional view of the main part in a state in which the pendulum is shifted to one side in the axial direction with respect to the pendulum support body of FIG. 21A.

FIGS. 21A is a cross-sectional view of a main part in which the pendulum support body 21C and the pendulum 23G are in a neutral positional relationship, and FIG. 21B is a cross-sectional view of a main part in a state in which the pendulum 23G is closer to one side in the axial direction with respect to the pendulum support body 21C of FIG. 21A.

In the centrifugal pendulum damper of the present configuration, instead of the recessed groove 127 of the pendulum mass body 115A and 115B of the seventh configuration example described above, the through hole 161 for supporting the rolling element 149 is formed as the rolling element support portion. A protruding portion 153 is provided from the inner peripheral surface toward the inside of the through hole on at least a part of the inner peripheral surface that supports the rolling element 149 of the through hole 161. Except for that point, the configuration is similar to that of the seventh configuration example.

The protruding portion 153 protrudes from the inner peripheral surface of the through hole 161 toward the inside of the through hole at the axially outer end portion of the pendulum mass body 151A and 151B in the through hole 161, that is, to the rotational center of the rolling element 149. The protruding portion 153 serves as a butting portion that abuts against a part of the shaft end portion 129 of the rolling element 149.

The protruding portion 153 is not necessarily provided at the axially outer end portion of the through hole 161 as illustrated in the drawing but may be formed at an arbitrary position of the through hole 161 if the rolling element 149 can be supported.

Further, the protruding portion 153 may be a flange formed continuously on the inner peripheral surface of the through hole 161 along the rolling direction of the rolling element 149, or a configuration in which a plurality of protrusions are spaced apart from each other may be provided.

In the centrifugal pendulum damper 100E of the present configuration, the protruding portions 153 formed on the pendulum mass bodies 151A and 151B abut against each other at the position of the sliding contact portion 157 at the shaft end portion 129 of the rolling element 149, thereby restricting the axial displacement of the rolling element 149 with respect to the pendulum mass body 151B. Further, the annular guide portion 135B behind the rolling element 149 in the displacement direction abuts against the pendulum support body 21C at the position of the sliding contact portion 137, thereby restricting the axial displacement of the rolling element 149 with respect to the pendulum support body 21C.

Further, when the pendulum 23G is shifted to the opposite side of the state illustrated in FIG. 21B, the shaft end portion 129 of the rolling element 119 abuts against the protruding portion 153 of the pendulum mass body 151A in the same manner as described above, and the guide inner surface 135a of the annular guide portion 135A abuts against the pendulum support body 21C. As a result, further axial displacement of the pendulum 23G with respect to the pendulum support body 21C is restricted.

According to the centrifugal pendulum damper 100E of the present configuration, since a part of the shaft end portion 129 of the rolling element 149 abuts against the protruding portion 153 at the side closer to the center axis (lower side in the drawing) of the rolling element 149 than the inner wall surface 161b of the through hole 161, the distance R from the rotation axis 158 of the rolling element 149 to the sliding contact portion 157 is smaller as compared to the configuration of the related art. Therefore, the frictional torque between the rolling element 149 and the pendulum mass body 151B is reduced by the rotation of the rolling element 149, and the vibration absorbing function of the rotational vibration due to the pendulum 23G is not impaired. Also, when the pendulum 23G is shifted to the side opposite to the above, the same operation and effect can be obtained.

The present invention is not limited to the above-described embodiment, but combination of the configurations of the embodiments with each other, or modification and application by a person skilled in the art based on the description of the specification and well-known technique is the plan of the present invention, and included in the scope seeking protection.

For example, in the above-described configuration example, the centrifugal pendulum damper is provided on the flywheel as an example, but the centrifugal pendulum damper may also be provided as a structure provided in the middle of a power transmission path from the engine to the driven member.

As described above, the following items are disclosed in this specification.

(1) A centrifugal pendulum damper in which a plurality of pendulums is swingably supported on a rotating body, wherein the pendulum includes a swinging shaft serving as the swing center of the pendulum and a rolling shaft including a rolling surface on an outer periphery thereof, the rotating body includes a plurality of pendulum support portions which is provided to correspond to the plurality of pendulums and supports the swinging shaft and the rolling shaft, and the pendulum support portion includes a swinging shaft guide portion including a radial guide surface configured to guide the swinging shaft in a radial direction of the rotating body, and a rolling shaft guide portion including a swing guide surface configured to come into rolling-contact with the rolling surface of the rolling shaft to cause the pendulum to swing around the swinging shaft.

According to the centrifugal pendulum damper, the pendulum is moved in the swinging direction, while enabling the swinging shaft to move in the radial direction with a simple configuration in which the swinging shaft guide portion and the rolling shaft guide portion are provided in the rotating body. Therefore, the centrifugal pendulum damper can be made compact and lightweight by reducing the manufacturing cost without making it complicated.

(2) The centrifugal pendulum damper according to (1), wherein the pendulum support portion is a through hole formed in the rotating body.

According to the centrifugal pendulum damper, the radial guide surface and the swing guide surface can be easily formed by the side surface of the through hole.

(3) The centrifugal pendulum damper according to (1) or (2), wherein the pendulum support portion is configured such that the radial guide surface of the swinging shaft guide portion corresponding to one pendulum and the swing guide surface of the rolling shaft guide portion are integrally and continuously formed.

According to the centrifugal pendulum damper, since the swinging shaft guide portion and the rolling shaft guide portion are integrally formed on the rotating body, the processing steps of each guiding portion can be completed only once, and the machining cost can be reduced and the machining accuracy Improvement can be achieved.

(4) The centrifugal pendulum damper according to (1) or (2), wherein the pendulum support portion is configured such that the swinging shaft guide portion corresponding to one pendulum and the rolling shaft guide portion are disposed at different positions of the rotating body to be separated from each other.

According to the centrifugal pendulum damper, it is possible to independently provide the swinging shaft guide portion and the rolling shaft guide portion on the rotary body, and the degree of freedom in designing each guide portion is improved.

(5) The centrifugal pendulum damper according to any one of (1) to (4), wherein the swing guide surface has a curved surface shape in which a trajectory of the center of gravity position of the pendulum is a cycloid curve or an epicycloid curve.

According to the centrifugal pendulum damper, it is possible to reduce the torsional vibration of the rotating body, without depending on the magnitude of the amplitude of the pendulum which is the mass body.

(6) The centrifugal pendulum damper according to any one of (1) to (5), wherein the swinging shaft of the pendulum moves in the radial direction along the radial guide surface as the rolling shaft rolls along the swing guide surface.

According to the centrifugal pendulum damper, the pendulum moves in the radial direction of the rotating body along the swinging shaft guide portion. Therefore, the trajectory of the position of the center of gravity of the swinging pendulum does not become a trajectory of a single radius with a constant radial distance from the center of the rotating body, but becomes a radius distance shorter than a trajectory of a single radius as the deflection angle increases. In other words, the pendulum can be made swing in a trajectory having a shorter radial distance than the single-radius trajectory with a simple configuration in which the swinging shaft and the roller shaft are guided by the swinging shaft guide portion and the roller shaft guide portion.

(7) The centrifugal pendulum damper according to any one of (1) to (6), wherein the rolling shaft includes a roller that makes rolling-contact with the swing guide surface.

According to the centrifugal pendulum damper, it is possible to reduce the friction which interferes with the pendulum movement of the pendulum and to improve the damping performance.

(8) The centrifugal pendulum damper according to any one of (1) to (6), wherein the rolling shaft includes a rolling shaft large diameter portion which is in rolling-contact with the swing guide surface and is larger in diameter than the rolling shaft end portion.

According to this centrifugal pendulum damper, it is possible to reduce the number of assembling steps (9) The centrifugal pendulum damper according to any one of (1) to (8), wherein the swinging shaft includes a roller that makes rolling-contact with the radial guide surface.

According to the centrifugal pendulum damper, it is possible to reduce the friction which interferes with the pendulum movement of the pendulum and to improve the damping performance.

(10) A centrifugal pendulum damper in which a support hole is formed in a pendulum support body to which a rotational force is transmitted, and a pendulum is swingably attached to the support hole, wherein the pendulum includes a pair of pendulum mass bodies connected by sandwiching the pendulum support body in an axial direction, and a rolling element inserted through the support hole and including an axial end portion supported by the pendulum mass body, the pendulum mass body includes a rolling element support portion into which the shaft end portion of the rolling element is inserted to be supported in a rollable and axially movable manner; and an abutment portion against which a part of the axial end portion abuts in a rearward displacement direction of the rolling element when the pendulum is displaced in the axial direction.

According to the centrifugal pendulum damper, due to the displacement of the pendulum, the rolling element abuts against the abutment portion of the pendulum mass body at a part of the axial end portion behind in the displacement direction. As a result, axial displacement of the pendulum is restricted. Since the contact position of the rolling element with the pendulum mass body is closer to the rotation center of the rolling element than the structure in the related art, the frictional torque between the rolling element and the pendulum mass body becomes small. As a result, even if the pendulum is displaced in the axial direction, the frictional torque generated is smaller than that of the structure in the related art, and the swing motion of the pendulum is less likely to be affected. Therefore, deterioration of vibration absorbing function of rotational vibration can be prevented.

(11) The centrifugal pendulum damper according to (10), wherein the rolling element support portion is a recessed groove formed on each of opposed faces of the pair of pendulum mass bodies facing each other, and the abutment portion is a groove bottom surface of the recessed groove.

According to this centrifugal pendulum damper, a recessed groove is formed on the surface facing the shaft end portion of the pendulum mass body, and a part of the shaft end portion of the rolling element abuts against the groove bottom surface of the recessed groove. By this groove, the total thickness of a pair of coupled pendulum mass bodies can be reduced, and the thickness of the centrifugal pendulum damper can be reduced.

(12) The centrifugal pendulum damper according to (10), wherein the rolling element support portion includes an inner circumferential surface that supports the rolling element, and the abutment portion is a protruding portion which protrudes from the inner circumferential surface toward the axial center of the rolling element.

According to the centrifugal pendulum damper, a part of the shaft end portion of the rolling element abuts against the protruding part formed on the pendulum mass body. Therefore, since the abutment position between the rolling element and the pendulum mass body becomes the rotation center side of the rolling element as compared with the configuration of the related art, the frictional torque between the rolling element and the pendulum mass body becomes smaller.

(13) The centrifugal pendulum damper according to (10) or (11), wherein the rolling element includes a convex portion protruding outward in an axial direction on the rotation axis center of the rolling element.

According to this centrifugal pendulum damper, since the convex portion is disposed coaxially with the rotation axis center of the rolling element, the frictional torque applied to the pendulum mass body from the rotating rolling element is minimized.

(14) The centrifugal pendulum damper of (13), wherein the convex portion is formed by a pin arranged along the rotation axis of the rolling element.

According to this centrifugal pendulum damper, the convex portion is provided by a simple process such as press-fitting a pin into a fitting hole formed in the rotation axis of the pendulum mass body. Therefore, when processing the convex portion, there is no need for a complicated step such as a cutting step of cutting the rolling element to form the convex portion. Also, by using a pin separate from the rolling element, the degree of freedom of selection of the material of the convex portion is enhanced.

(15) The centrifugal pendulum damper according to (13) or (14), wherein the tip of the protrusion has a curved surface shape.

According to this centrifugal pendulum damper, the contact between the tip of the convex portion and the pendulum mass body is in a point-contact state. Therefore, the contact friction between the convex portion and the axial end portion and the pendulum mass body is further reduced as compared with the case of surface contact or line contact.

(16) The abutment portion according to any one of (10) to (15), wherein the rolling element includes an annular guide portion protruding radially outward from an outer circumferential surface of the rolling element, between the one pendulum mass body and the pendulum support body and between the other pendulum mass body and the pendulum support body, respectively, and when the pendulum is displaced in the axial direction, the pendulum support body of the annular guide portion abuts on the support body.

According to this centrifugal pendulum damper, contact between the pendulum mass body and the pendulum support body due to axial movement of the pendulum can be prevented by abutting the annular guide section against the pendulum support body.

(17) A torque transmission device including the centrifugal pendulum damper.

According to this torque transmission device, it is possible to reduce the manufacturing cost and reduce the size and weight, without making a complicated mechanism.

This application is based on Japanese patent application (Japanese Patent Application No. 2016-5329) filed on Jan. 14, 2016, Japanese patent application (Japanese Patent Application No. 2016-214432) filed on Nov. 1, 2016, and Japanese patent application (Japanese Patent Application No. 2017-2042) filed on Jan. 10, 2017, the contents of which are hereby incorporated by reference.

DESCRIPTION OF REFERENCE NUMERALS 21, 21A, 21B, 21C: Pendulum support body (rotating body)
23, 23A, 23B, 23C, 23D, 23E, 23F, 23G: Pendulum
31, 71, 91: Pendulum piece
33, 34, 93: Swinging shaft
35, 75: Roller shaft (rolling shaft)
37: Roller (rolling shaft)
55, 61: Swinging shaft guide portion
55a: Side wall (radial guide surface)
57, 63: Roller shaft guide portion (rolling shaft guide portion)
57a: Side wall (swing guide surface)
90: Swinging shaft roller (rolling shaft)
95: Rolling shaft
95a: Rolling shaft end portion
95b: Rolling shaft large diameter portion
97: Rolling shaft end guide
100, 100B, 100C, 100D, 100E: Centrifugal pendulum damper
115: Pendulum mass body
117: Connecting element
119: Rolling element
125: Support hole
127: Recessed groove (rolling element support portion)
127b: Groove bottom surface (abutment portion)
129: Shaft end portion
131: Convex portion
135A, 135B: Annular guide portion
141: Rolling element
143: Pin
149: Rolling element
151A, 151B: Pendulum mass body
153: Protruding portion (abutment portion)
161: Through hole (rolling element support portion)
200: Torque transmission device

The invention claimed is:

1. A centrifugal pendulum damper in which a plurality of pendulums are swingably supported on a rotating body, wherein:
   each pendulum includes a swinging shaft serving as the swing center of the pendulum and a rolling shaft including a rolling surface on an outer periphery thereof;
   the rotating body includes a plurality of pendulum support portions which are provided to correspond to the plurality of pendulums and support the swinging shaft and the rolling shaft;
   the plurality of pendulum support portions includes a swinging shaft guide portion including a radial guide surface configured to guide the swinging shaft in a radial direction of the rotating body, and a rolling shaft guide portion including a swing guide surface configured to come into rolling-contact with the rolling surface of the rolling shaft to cause the pendulum to swing around the swinging shaft; and
   the plurality of pendulum support portions is configured such that the radial guide surface of the swinging shaft guide portion corresponding to the one pendulum and the swing guide surface of the rolling shaft guide portion are integrally and continuously formed.

2. The centrifugal pendulum damper according to claim 1, wherein the plurality of pendulum support portions are through holes formed in the rotating body.

3. The centrifugal pendulum damper according to claim 1, wherein
the swing guide surface has a curved surface shape against which the rolling shaft is pressed, thereby preventing the swinging shaft from coming off from the swinging shaft guide portion.

4. The centrifugal pendulum damper according to claim 1, wherein
the swing guide surface has a curved surface shape in which a trajectory of the center of gravity position of the pendulum is a cycloid curve or an epicycloid curve.

5. The centrifugal pendulum damper according to claim 1, wherein
the swinging shaft of the pendulum moves in the radial direction along the radial guide surface as the rolling shaft rolls along the swing guide surface.

6. The centrifugal pendulum damper according to claim 1, wherein
the rolling shaft includes a roller that makes rolling-contact with the swing guide surface.

7. The centrifugal pendulum damper according to claim 1, wherein
the rolling shaft includes a rolling shaft large diameter portion which is in rolling-contact with the swing guide surface and is larger in diameter than a rolling shaft end portion.

8. The centrifugal pendulum damper according to claim 1, wherein
the swinging shaft includes a roller that makes rolling-contact with the radial guide surface.

9. A torque transmission device comprising the centrifugal pendulum damper according to claim 1.

10. A centrifugal pendulum damper in which a plurality of pendulums are swingably supported on a rotating body, wherein:
each pendulum includes a swinging shaft serving as the swing center of the pendulum and a rolling shaft including a rolling surface on an outer periphery thereof;
the rotating body includes a plurality of pendulum support portions which are provided to correspond to the plurality of pendulums and support the swinging shaft and the rolling shaft;
the plurality of pendulum support portions includes a swinging shaft guide portion including a radial guide surface configured to guide the swinging shaft in a radial direction of the rotating body, and a rolling shaft guide portion including a swing guide surface configured to come into rolling-contact with the rolling surface of the rolling shaft to cause the pendulum to swing around the swinging shaft;
the swing guide surface has a curved surface shape in which a trajectory of the center of gravity position of the pendulum is a cycloid curve or an epicycloid curve;
the swing guide surface has a shape of a single radius of curvature; and
the center of gravity position of the pendulum deviates from the center of the rolling shaft.

11. The centrifugal pendulum damper according to claim 10, wherein
the plurality of pendulum support portions is configured such that the swinging shaft guide portion corresponding to one pendulum and the rolling shaft guide portion are disposed at different positions of the rotating body to be separated from each other.

12. A centrifugal pendulum damper in which a support hole is formed in a pendulum support body to which a rotational force is transmitted, and a pendulum is swingably attached to the support hole, wherein:
the pendulum includes:
a pair of pendulum mass bodies connected by sandwiching the pendulum support body in an axial direction; and
a rolling element inserted through the support hole and including an axial end portion supported by the pendulum mass body; and
the pendulum mass body includes:
a rolling element support portion into which the axial end portion of the rolling element is inserted to be supported in a rollable and axially movable manner; and
an abutment portion against which a part of the axial end portion abuts in a rearward displacement direction of the rolling element when the pendulum is displaced in the axial direction.

13. The centrifugal pendulum damper according to claim 12, wherein:
the rolling element support portion is a recessed groove formed on each of opposed faces of the pair of pendulum mass bodies facing each other; and
the abutment portion is a groove bottom surface of the recessed groove.

14. The centrifugal pendulum damper according to claim 12, wherein:
the rolling element support portion includes an inner circumferential surface that supports the rolling element; and
the abutment portion is a protruding portion which protrudes from the inner circumferential surface toward the axial center of the rolling element.

15. A torque transmission device comprising the centrifugal pendulum damper according to claim 12.

* * * * *